(12) United States Patent
Binder

(10) Patent No.: US 7,715,441 B2
(45) Date of Patent: *May 11, 2010

(54) NETWORK COMBINING WIRED AND NON-WIRED SEGMENTS

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 1073 days.

This patent is subject to a terminal disclaimer.

(21) Appl. No.: 11/128,383

(22) Filed: May 13, 2005

(65) Prior Publication Data

US 2005/0259691 A1 Nov. 24, 2005

Related U.S. Application Data

(63) Continuation of application No. 10/998,015, filed on Nov. 29, 2004, which is a continuation of application No. 09/552,564, filed on Apr. 19, 2000, now Pat. No. 6,842,459.

(51) Int. Cl.
*H04J 1/02* (2006.01)
(52) U.S. Cl. .................. 370/493; 370/463; 375/222
(58) Field of Classification Search .................. 370/463, 370/352–356, 480–488, 493–495; 375/219–220, 375/222–223
See application file for complete search history.

(56) References Cited

U.S. PATENT DOCUMENTS

| | | | |
|---|---|---|---|
| 2,289,435 A | 10/1942 | Tunick | |
| 2,411,786 A | 11/1946 | Halstead | |
| 3,590,271 A | 6/1971 | Peters | |
| 3,656,112 A | 4/1972 | Paull | |
| 3,730,980 A | 5/1973 | Kirk, Jr. | |
| 3,805,265 A | 4/1974 | Lester | |
| 3,836,888 A | 9/1974 | Boenke et al. | |

(Continued)

FOREIGN PATENT DOCUMENTS

EP 0385695 9/1990

(Continued)

OTHER PUBLICATIONS

Evans, Grayson, *CEBus Standard User's Guide: A Complete Technical Overview*, May 1996, Chapters 1, 2, and 4-6; pp. 1-1 to 2-13, 4-1 to 7-89.

(Continued)

*Primary Examiner*—Thai D Hoang
(74) *Attorney, Agent, or Firm*—Browdy and Neimark, PLLC

(57) ABSTRACT

A local area network (60) within a residence or other building, including both wired (5) and non-wired segments (53). The wired segments are based on new or existing wires (5a, 5b, 5c, 5d, 5e) in the building, wherein access to the wires is provided by means of outlets (61a, 61d), such as a telephone system, electrical power distribution system, or cable television wiring system. The non-wired segments are based on communication using propagated waves such as radio, sound, or light (e.g. infrared). The wired and non-wired segments interface in the outlet, using a module (50) that serves as mediator between the segments. The module can be integrated into the outlet, partially housed in the outlet, or attached externally to the outlet. Such a network allows for integrated communication of data units (24b) connected by wires and data units (24a, 24d) connected without wires.

38 Claims, 8 Drawing Sheets

U.S. PATENT DOCUMENTS

| | | | |
|---|---|---|---|
| 3,846,703 A | 11/1974 | Stewart et al. | |
| 3,886,454 A | 5/1975 | Oakley et al. | |
| 3,898,566 A | 8/1975 | Switzer et al. | |
| 4,031,543 A | 6/1977 | Holz | |
| 4,063,220 A | 12/1977 | Metcalfe et al. | |
| 4,079,415 A | 3/1978 | Will | |
| 4,199,761 A | 4/1980 | Whyte et al. | |
| 4,200,862 A | 4/1980 | Campbell et al. | |
| 4,303,993 A | 12/1981 | Panepinto, Jr. et al. | |
| 4,343,042 A | 8/1982 | Schrock et al. | |
| 4,367,548 A | 1/1983 | Cotten, Jr. et al. | |
| 4,413,229 A | 11/1983 | Grant | |
| 4,456,925 A | 6/1984 | Skerlos et al. | |
| 4,459,434 A | 7/1984 | Benning et al. | |
| 4,462,113 A | 7/1984 | Iwata | |
| 4,467,140 A | 8/1984 | Fathauer et al. | |
| 4,468,538 A | 8/1984 | Cripps | |
| 4,484,218 A | 11/1984 | Boland et al. | |
| 4,509,211 A | 4/1985 | Robbins | |
| 4,512,025 A | 4/1985 | Frankel et al. | |
| 4,512,033 A | 4/1985 | Schrock | |
| 4,521,881 A | 6/1985 | Stapleford et al. | |
| 4,538,174 A | 8/1985 | Gargini et al. | |
| 4,551,721 A | 11/1985 | Kozlik | |
| 4,623,920 A | 11/1986 | Dufresne et al. | |
| 4,644,526 A | 2/1987 | Wu | |
| 4,646,296 A | 2/1987 | Bartholet et al. | |
| 4,706,274 A | 11/1987 | Baker et al. | |
| 4,731,821 A | 3/1988 | Jackson, III | |
| 4,746,809 A | 5/1988 | Coleman et al. | |
| 4,755,792 A | 7/1988 | Pezzolo et al. | |
| 4,766,402 A | 8/1988 | Crane | |
| 4,769,837 A | 9/1988 | McCormick et al. | |
| 4,785,448 A | 11/1988 | Reichert et al. | |
| 4,821,319 A | 4/1989 | Middleton et al. | |
| 4,850,009 A | 7/1989 | Zook et al. | |
| 4,864,588 A | 9/1989 | Simpson et al. | |
| 4,866,733 A | 9/1989 | Morishita | |
| 4,866,757 A | 9/1989 | Nilssen | |
| 4,885,766 A | 12/1989 | Yasuoka et al. | |
| 4,885,803 A | 12/1989 | Hermann et al. | |
| 4,891,694 A | 1/1990 | Way | |
| 4,893,326 A | 1/1990 | Duran et al. | |
| 4,896,349 A | 1/1990 | Kubo et al. | |
| 4,901,218 A | 2/1990 | Cornwell | |
| 4,912,721 A | 3/1990 | Pidgeon, Jr. et al. | |
| 4,918,690 A | 4/1990 | Markkula, Jr. et al. | |
| 4,937,819 A | 6/1990 | King | |
| 4,980,665 A | 12/1990 | Schotz | |
| 4,989,081 A | 1/1991 | Miyagawa et al. | |
| 4,994,908 A | 2/1991 | Kuban et al. | |
| 4,996,709 A | 2/1991 | Heep et al. | |
| 4,999,613 A | 3/1991 | Williamson et al. | |
| 5,027,426 A | 6/1991 | Chiocca, Jr. | |
| 5,045,948 A | 9/1991 | Streck et al. | |
| 5,068,890 A | 11/1991 | Nilssen | |
| 5,090,052 A | 2/1992 | Nakajima et al. | |
| 5,109,222 A | 4/1992 | Welty | |
| 5,115,463 A | 5/1992 | Moldavsky et al. | |
| 5,142,397 A | 8/1992 | Dockery | |
| 5,150,365 A * | 9/1992 | Hirata et al. | 370/487 |
| 5,161,021 A | 11/1992 | Tsai | |
| 5,187,803 A | 2/1993 | Sohner et al. | |
| 5,210,788 A | 5/1993 | Nilssen | |
| 5,230,086 A | 7/1993 | Saul | |
| 5,239,540 A | 8/1993 | Rovira et al. | |
| 5,243,627 A | 9/1993 | Betts et al. | |
| 5,255,267 A | 10/1993 | Hansen et al. | |
| 5,255,268 A | 10/1993 | Cato et al. | |
| 5,265,150 A | 11/1993 | Helmkamp et al. | |
| 5,274,631 A | 12/1993 | Bhardwaj | |
| 5,276,918 A | 1/1994 | Cornforth et al. | |
| 5,278,889 A | 1/1994 | Papanicolaou et al. | |
| 5,297,203 A | 3/1994 | Rose et al. | |
| 5,321,736 A | 6/1994 | Beasley | |
| 5,321,846 A | 6/1994 | Yokota et al. | |
| 5,334,975 A | 8/1994 | Wachob et al. | |
| 5,343,240 A | 8/1994 | Yu | |
| 5,377,255 A | 12/1994 | Beasley | |
| 5,381,459 A | 1/1995 | Lappington | |
| 5,390,235 A | 2/1995 | Beasley | |
| 5,404,570 A | 4/1995 | Charas et al. | |
| 5,408,260 A | 4/1995 | Arnon | |
| 5,418,559 A | 5/1995 | Blahut | |
| 5,421,030 A | 5/1995 | Baran | |
| 5,432,838 A | 7/1995 | Purchase et al. | |
| 5,440,335 A | 8/1995 | Beveridge | |
| 5,481,249 A | 1/1996 | Sato | |
| 5,489,894 A | 2/1996 | Murray | |
| 5,521,631 A | 5/1996 | Budow et al. | |
| 5,537,637 A | 7/1996 | Sugita et al. | |
| 5,539,449 A | 7/1996 | Blahut et al. | |
| 5,539,821 A | 7/1996 | Blonder | |
| 5,539,880 A | 7/1996 | Lakhani | |
| 5,565,855 A | 10/1996 | Knibbe | |
| 5,570,355 A | 10/1996 | Dail et al. | |
| 5,572,575 A | 11/1996 | Yamamoto et al. | |
| 5,574,964 A | 11/1996 | Hamlin | |
| 5,579,221 A | 11/1996 | Mun | |
| 5,581,555 A | 12/1996 | Dubberly et al. | |
| 5,585,837 A | 12/1996 | Nixon | |
| 5,586,121 A | 12/1996 | Moura et al. | |
| 5,590,173 A | 12/1996 | Beasley | |
| 5,592,540 A | 1/1997 | Beveridge | |
| 5,596,631 A | 1/1997 | Chen | |
| 5,600,333 A | 2/1997 | Justice et al. | |
| 5,603,080 A | 2/1997 | Kallander et al. | |
| 5,613,190 A | 3/1997 | Hylton | |
| 5,619,251 A | 4/1997 | Kuroiwa et al. | |
| 5,619,505 A | 4/1997 | Grube et al. | |
| 5,628,055 A | 5/1997 | Stein | |
| 5,634,191 A | 5/1997 | Beasley | |
| 5,642,155 A | 6/1997 | Cheng | |
| 5,657,358 A | 8/1997 | Panech et al. | |
| 5,666,293 A | 9/1997 | Metz et al. | |
| 5,671,220 A | 9/1997 | Tonomura | |
| 5,696,861 A | 12/1997 | Schimmeyer et al. | |
| 5,708,705 A | 1/1998 | Yamashita et al. | |
| 5,708,961 A | 1/1998 | Hylton et al. | |
| 5,719,858 A | 2/1998 | Moore | |
| 5,719,872 A | 2/1998 | Dubberly et al. | |
| 5,722,076 A | 2/1998 | Sakabe et al. | |
| 5,729,824 A | 3/1998 | O'Neill et al. | |
| 5,731,664 A | 3/1998 | Posa | |
| 5,734,678 A | 3/1998 | Paneth et al. | |
| RE35,774 E | 4/1998 | Moura et al. | |
| 5,736,965 A | 4/1998 | Mosebrook et al. | |
| 5,745,837 A | 4/1998 | Fuhrmann | |
| 5,748,104 A | 5/1998 | Argyroudis et al. | |
| 5,754,539 A | 5/1998 | Metz et al. | |
| 5,760,822 A | 6/1998 | Coutinho | |
| 5,767,895 A | 6/1998 | Yashiro et al. | |
| 5,774,526 A | 6/1998 | Propp et al. | |
| 5,774,789 A | 6/1998 | van der Kaay et al. | |
| 5,777,769 A | 7/1998 | Coutinho | |
| 5,793,265 A | 8/1998 | Spielman | |
| 5,796,739 A | 8/1998 | Kim | |
| 5,802,173 A | 9/1998 | Hamilton-Piercy et al. | |
| 5,802,177 A | 9/1998 | Daniel et al. | |
| 5,805,591 A | 9/1998 | Naboulsi et al. | |
| 5,805,806 A | 9/1998 | McArthur | |
| 5,809,431 A | 9/1998 | Bustamante et al. | |
| 5,812,184 A | 9/1998 | Martinez | |
| 5,815,086 A | 9/1998 | Ivie et al. | |

| | | | | | | |
|---|---|---|---|---|---|---|
| 5,818,845 | A | 10/1998 | Moura et al. | 6,157,645 A | 12/2000 | Shobatake |
| 5,822,677 | A | 10/1998 | Peyrovian | 6,166,730 A | 12/2000 | Goode et al. |
| 5,822,678 | A | 10/1998 | Evanyk | 6,167,120 A | 12/2000 | Kikinis |
| 5,828,663 | A | 10/1998 | Ikegami | 6,175,860 B1 | 1/2001 | Gaucher |
| 5,832,364 | A | 11/1998 | Gustafson | 6,188,871 B1 | 2/2001 | Kitamura et al. |
| 5,832,365 | A | 11/1998 | Chen et al. | 6,216,171 B1 | 4/2001 | Isono et al. |
| 5,835,863 | A | 11/1998 | Ikenouchi et al. | 6,218,931 B1 | 4/2001 | Asghar et al. |
| 5,838,226 | A | 11/1998 | Houggy et al. | 6,219,409 B1 | 4/2001 | Smith et al. |
| 5,841,360 | A | 11/1998 | Binder | 6,236,653 B1 | 5/2001 | Dalton et al. |
| 5,841,841 | A | 11/1998 | Dodds et al. | 6,243,413 B1 | 6/2001 | Beukema |
| 5,845,190 | A | 12/1998 | Bushue et al. | 6,243,571 B1 | 6/2001 | Bullock et al. |
| 5,847,751 | A | 12/1998 | Safadi | 6,249,671 B1 | 6/2001 | Tucker et al. |
| 5,848,054 | A | 12/1998 | Mosebrook et al. | 6,256,296 B1 | 7/2001 | Ruziak et al. |
| 5,852,631 | A | 12/1998 | Scott | 6,259,910 B1 | 7/2001 | Fairfield et al. |
| 5,864,284 | A | 1/1999 | Sanderson | 6,307,862 B1 | 10/2001 | Silverman |
| 5,870,513 | A | 2/1999 | Williams | 6,317,884 B1 | 11/2001 | Eames et al. |
| 5,886,732 | A | 3/1999 | Humpleman | 6,330,244 B1 | 12/2001 | Swartz et al. |
| 5,889,765 | A | 3/1999 | Gibbs | 6,346,875 B1 | 2/2002 | Puckette et al. |
| 5,896,443 | A | 4/1999 | Dichter | 6,349,133 B1 | 2/2002 | Matthews et al. |
| 5,896,556 | A | 4/1999 | Moreland et al. | 6,353,599 B1 | 3/2002 | Bi et al. |
| 5,896,569 | A | 4/1999 | Butler et al. | 6,381,745 B1 | 4/2002 | Paul |
| 5,905,442 | A | 5/1999 | Mosebrook et al. | 6,392,349 B1 | 5/2002 | Crenshaw |
| 5,910,776 | A | 6/1999 | Black | 6,396,391 B1 | 5/2002 | Binder |
| 5,917,624 | A | 6/1999 | Wagner | 6,397,288 B1 | 5/2002 | Rye et al. |
| 5,918,016 | A | 6/1999 | Brewer et al. | 6,400,815 B1 | 6/2002 | Gilboy et al. |
| 5,923,361 | A | 7/1999 | Sutton, Jr. | 6,400,957 B1 | 6/2002 | Rodrigues et al. |
| 5,926,531 | A | 7/1999 | Petite | 6,418,149 B1 | 7/2002 | Swisher et al. |
| 5,930,682 | A | 7/1999 | Schwartz et al. | 6,438,109 B1 | 8/2002 | Karaoguz et al. |
| 5,930,719 | A | 7/1999 | Babitch et al. | 6,449,291 B1 | 9/2002 | Burns et al. |
| 5,936,660 | A | 8/1999 | Gurantz | 6,452,910 B1 | 9/2002 | Vij et al. |
| 5,937,342 | A | 8/1999 | Kline | 6,452,923 B1 | 9/2002 | Gerszberg et al. |
| 5,937,348 | A | 8/1999 | Cina et al. | 6,453,473 B1 | 9/2002 | Watson, Jr. |
| 5,940,400 | A | 8/1999 | Eastmond et al. | 6,463,588 B1 | 10/2002 | Jenkins et al. |
| 5,946,047 | A | 8/1999 | Levan | 6,483,470 B1 | 11/2002 | Hohnstein et al. |
| 5,946,048 | A | 8/1999 | Levan | 6,492,897 B1 | 12/2002 | Mowery, Jr. |
| 5,946,616 | A | 8/1999 | Schornack et al. | 6,493,875 B1 | 12/2002 | Eames et al. |
| 5,950,149 | A | 9/1999 | Fieramosca et al. | 6,501,942 B1 | 12/2002 | Weissman et al. |
| 5,953,344 | A | 9/1999 | Dail et al. | 6,513,163 B1 | 1/2003 | Silvia et al. |
| 5,953,670 | A | 9/1999 | Newson | 6,526,581 B1 | 2/2003 | Edson |
| 5,963,844 | A | 10/1999 | Dail | 6,535,110 B1 | 3/2003 | Arora et al. |
| 5,977,913 | A | 11/1999 | Christ | 6,535,480 B1 | 3/2003 | Bhagavath et al. |
| 5,982,363 | A | 11/1999 | Naiff | 6,546,017 B1 | 4/2003 | Khaunte |
| 5,982,854 | A | 11/1999 | Ehreth | 6,546,098 B1 | 4/2003 | Henderson |
| 5,983,070 | A | 11/1999 | Georges et al. | 6,549,616 B1 | 4/2003 | Binder |
| 5,983,117 | A | 11/1999 | Sandler et al. | 6,553,568 B1 | 4/2003 | Fijolek et al. |
| 5,986,574 | A | 11/1999 | Colton | 6,563,418 B1 | 5/2003 | Moon |
| 5,987,303 | A | 11/1999 | Dutta et al. | 6,573,826 B2 | 6/2003 | Pan |
| 5,994,998 | A | 11/1999 | Fisher et al. | 6,577,231 B2 | 6/2003 | Litwin, Jr. et al. |
| 5,995,593 | A | 11/1999 | Cho | 6,577,642 B1 | 6/2003 | Fijolek et al. |
| 6,005,884 | A | 12/1999 | Cook et al. | 6,580,728 B1 | 6/2003 | Cook et al. |
| 6,009,465 | A | 12/1999 | Decker et al. | 6,581,208 B1 | 6/2003 | Inaguma |
| 6,014,386 | A | 1/2000 | Abraham | 6,583,719 B2 | 6/2003 | Okada et al. |
| 6,021,158 | A | 2/2000 | Schurr et al. | 6,587,479 B1 | 7/2003 | Bianchi et al. |
| 6,026,150 | A | 2/2000 | Frank et al. | 6,587,739 B1 | 7/2003 | Abrams et al. |
| 6,028,860 | A | 2/2000 | Laubach et al. | 6,600,734 B1 | 7/2003 | Gernert et al. |
| 6,029,047 | A | 2/2000 | Ishida et al. | 6,615,407 B1 | 9/2003 | Inaguma |
| 6,032,057 | A | 2/2000 | Kiiski | 6,618,353 B2 | 9/2003 | Merrill et al. |
| 6,040,759 | A | 3/2000 | Sanderson | 6,618,387 B1 | 9/2003 | Liu et al. |
| 6,052,380 | A | 4/2000 | Bell | 6,618,578 B1 | 9/2003 | Petite |
| 6,055,242 | A | 4/2000 | Doshi et al. | 6,622,304 B1 | 9/2003 | Carhart |
| 6,069,588 | A | 5/2000 | O'Neill | 6,637,030 B1 | 10/2003 | Klein |
| 6,075,787 | A | 6/2000 | Bobeck et al. | 6,650,871 B1 | 11/2003 | Cannon et al. |
| 6,081,519 | A | 6/2000 | Petler | 6,653,932 B1 | 11/2003 | Beamish et al. |
| 6,081,533 | A | 6/2000 | Laubach et al. | 6,654,616 B1 | 11/2003 | Pope, Jr. et al. |
| 6,088,569 | A | 7/2000 | Bach et al. | 6,658,010 B1 | 12/2003 | Enns et al. |
| 6,101,228 | A | 8/2000 | Hebron et al. | 6,659,947 B1 | 12/2003 | Carter et al. |
| 6,101,341 | A | 8/2000 | Manabe | 6,668,328 B1 | 12/2003 | Bell |
| 6,104,727 | A | 8/2000 | Moura et al. | 6,671,519 B2 | 12/2003 | Jeon et al. |
| 6,130,896 | A | 10/2000 | Lueker et al. | 6,683,531 B2 | 1/2004 | Diamanti et al. |
| 6,137,793 | A | 10/2000 | Gorman et al. | 6,690,677 B1 | 2/2004 | Binder |
| 6,141,356 | A | 10/2000 | Gorman | 6,697,864 B1 | 2/2004 | Demirtjis et al. |
| 6,144,399 | A | 11/2000 | Manchester et al. | 6,704,545 B1 | 3/2004 | Wala |
| 6,151,480 | A | 11/2000 | Fischer et al. | 6,710,721 B1 | 3/2004 | Holowick |

| | | |
|---|---|---|
| 6,711,417 B1 | 3/2004 | Gorman et al. |
| 6,714,534 B1 | 3/2004 | Gerszberg et al. |
| 6,721,298 B1 | 4/2004 | Vella-Coleiro |
| 6,725,059 B1 | 4/2004 | Bell |
| 6,731,945 B2 | 5/2004 | Do et al. |
| 6,732,368 B1 | 5/2004 | Michael et al. |
| 6,737,984 B1 | 5/2004 | Welles, II et al. |
| 6,738,641 B1 | 5/2004 | Elsasser |
| 6,745,392 B1 | 6/2004 | Basawapatna et al. |
| 6,748,080 B2 | 6/2004 | Russ et al. |
| 6,751,441 B1 | 6/2004 | Murray et al. |
| 6,759,946 B2 | 7/2004 | Sahinoglu et al. |
| 6,760,384 B1 | 7/2004 | Garreau et al. |
| 6,765,931 B1 | 7/2004 | Rabenko et al. |
| 6,771,164 B1 | 8/2004 | Fink |
| 6,778,817 B1 | 8/2004 | Bullock et al. |
| 6,781,530 B2 | 8/2004 | Moore |
| 6,782,048 B2 | 8/2004 | Santhoff |
| 6,796,555 B1 | 9/2004 | Blahut |
| 6,807,463 B1 | 10/2004 | Cunningham et al. |
| 6,819,682 B1 | 11/2004 | Rabenko et al. |
| 6,822,946 B1 | 11/2004 | Wallace |
| 6,826,174 B1 | 11/2004 | Erekson et al. |
| 6,831,921 B2 | 12/2004 | Higgins |
| 6,834,057 B1 | 12/2004 | Rabenko et al. |
| 6,842,459 B1 * | 1/2005 | Binder ................... 370/463 |
| 6,844,809 B2 | 1/2005 | Manis et al. |
| 6,848,116 B1 | 1/2005 | Land |
| 6,850,560 B2 | 2/2005 | Heusala |
| 6,857,132 B1 | 2/2005 | Rakib et al. |
| 6,868,058 B1 | 3/2005 | Cooper et al. |
| 6,885,674 B2 | 4/2005 | Hunt et al. |
| 6,901,439 B1 | 5/2005 | Bonasia et al. |
| 6,912,209 B1 | 6/2005 | Thi et al. |
| 6,930,987 B1 | 8/2005 | Fukuda et al. |
| 6,931,659 B1 | 8/2005 | Kinemura |
| 6,933,835 B2 | 8/2005 | Kline |
| 6,941,576 B2 | 9/2005 | Amit |
| 6,947,736 B2 | 9/2005 | Shaver et al. |
| 6,950,567 B2 | 9/2005 | Kline |
| 6,956,826 B1 | 10/2005 | Binder |
| 6,961,763 B1 | 11/2005 | Wang et al. |
| 6,963,931 B2 | 11/2005 | Bunn et al. |
| 6,963,936 B2 | 11/2005 | Billington et al. |
| 6,965,302 B2 | 11/2005 | Mollenkopf et al. |
| 6,980,089 B1 | 12/2005 | Kline |
| 6,985,072 B2 | 1/2006 | Omidi et al. |
| 6,985,714 B2 | 1/2006 | Akiyama et al. |
| 6,993,317 B2 | 1/2006 | Belsak, Jr. |
| 6,995,657 B2 | 2/2006 | Zalitzky et al. |
| 6,996,837 B1 | 2/2006 | Miura et al. |
| 6,998,964 B2 | 2/2006 | Lomax, Jr. et al. |
| 7,002,898 B1 | 2/2006 | Lou |
| 7,003,102 B2 | 2/2006 | Kiko |
| 7,006,006 B2 | 2/2006 | Witkow et al. |
| 7,009,527 B2 | 3/2006 | Seo |
| 7,009,946 B1 | 3/2006 | Kardach |
| 7,015,797 B2 | 3/2006 | Kaylor et al. |
| 7,023,868 B2 | 4/2006 | Rabenko et al. |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,035,281 B1 | 4/2006 | Spearman et al. |
| 7,036,140 B2 | 4/2006 | Terry et al. |
| 7,047,555 B1 | 5/2006 | Inaguma et al. |
| 7,064,654 B2 | 6/2006 | Berkman et al. |
| 7,082,320 B2 | 7/2006 | Kattukaran et al. |
| 7,088,238 B2 | 8/2006 | Karaoguz et al. |
| 7,099,368 B2 | 8/2006 | Santhoff et al. |
| 7,099,621 B1 | 8/2006 | Chadwick |
| 7,103,240 B2 | 9/2006 | Kline |
| 7,106,261 B2 | 9/2006 | Nagel et al. |
| 7,106,388 B2 | 9/2006 | Vorenkamp et al. |
| 7,106,721 B1 | 9/2006 | Binder |
| 7,113,134 B1 | 9/2006 | Berkman |
| 7,113,763 B2 | 9/2006 | Heinonen et al. |
| 7,116,685 B2 | 10/2006 | Brown et al. |
| 7,117,520 B2 | 10/2006 | Stewart |
| 7,133,729 B1 | 11/2006 | Wang et al. |
| 7,138,886 B2 | 11/2006 | Strull et al. |
| 7,142,560 B2 | 11/2006 | Mansfield |
| 7,143,299 B1 | 11/2006 | Rubinstein et al. |
| 7,149,474 B1 | 12/2006 | Mikhak |
| 7,151,575 B1 | 12/2006 | Landry et al. |
| 7,155,214 B2 | 12/2006 | Struthers et al. |
| 7,162,377 B2 | 1/2007 | Amrod et al. |
| 7,164,690 B2 | 1/2007 | Limb et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,181,023 B1 | 2/2007 | Andrews et al. |
| 7,187,946 B2 | 3/2007 | Palan |
| 7,194,251 B2 | 3/2007 | Rubinstein et al. |
| 7,209,497 B2 | 4/2007 | Weinstein et al. |
| 7,209,945 B2 | 4/2007 | Hicks, III et al. |
| 7,257,106 B2 | 8/2007 | Chen et al. |
| 7,257,108 B2 | 8/2007 | Cheston et al. |
| 7,266,344 B2 | 9/2007 | Rodriguez |
| 7,292,859 B2 | 11/2007 | Park |
| 7,295,518 B1 | 11/2007 | Monk et al. |
| 7,299,287 B1 | 11/2007 | Rubinstein et al. |
| 7,310,355 B1 | 12/2007 | Krein et al. |
| 7,453,895 B2 * | 12/2007 | Binder ................... 370/465 |
| 7,319,717 B2 | 1/2008 | Zitting |
| 7,322,860 B2 | 1/2008 | Martich et al. |
| 7,324,488 B1 | 1/2008 | Rubinstein et al. |
| 7,324,824 B2 | 1/2008 | Smith et al. |
| 7,330,695 B2 | 2/2008 | Karschnia et al. |
| 7,331,819 B2 | 2/2008 | Nelson et al. |
| 7,345,998 B2 | 3/2008 | Cregg et al. |
| 7,346,918 B2 | 3/2008 | Hennenhoefer et al. |
| 7,359,392 B2 | 4/2008 | Bianchi et al. |
| 7,362,285 B2 | 4/2008 | Webb et al. |
| 7,375,445 B1 | 5/2008 | Smith |
| 2001/0036199 A1 | 11/2001 | Terry |
| 2001/0039660 A1 | 11/2001 | Vasilevsky et al. |
| 2002/0011923 A1 | 1/2002 | Cunningham et al. |
| 2002/0019875 A1 | 2/2002 | Garrett et al. |
| 2002/0021465 A1 | 2/2002 | Moore et al. |
| 2002/0031114 A1 | 3/2002 | Terry et al. |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0049036 A1 | 4/2002 | Bullock et al. |
| 2002/0059634 A1 | 5/2002 | Terry et al. |
| 2002/0061012 A1 | 5/2002 | Thi et al. |
| 2002/0069417 A1 | 6/2002 | Kliger et al. |
| 2002/0075806 A1 | 6/2002 | Shalvi et al. |
| 2002/0095662 A1 | 7/2002 | Ashlock et al. |
| 2002/0097821 A1 | 7/2002 | Hebron et al. |
| 2002/0116720 A1 | 8/2002 | Terry et al. |
| 2002/0128009 A1 | 9/2002 | Boch et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194383 A1 | 12/2002 | Cohen et al. |
| 2002/0194605 A1 | 12/2002 | Cohen et al. |
| 2003/0005450 A1 | 1/2003 | Smith |
| 2003/0006881 A1 | 1/2003 | Reyes |
| 2003/0018975 A1 | 1/2003 | Stone |
| 2003/0066082 A1 | 4/2003 | Kliger et al. |
| 2003/0067910 A1 | 4/2003 | Razazian et al. |
| 2003/0099228 A1 | 5/2003 | Alcock |

| | | |
|---|---|---|
| 2003/0100288 A1 | 5/2003 | Tomlinson, Jr. et al. |
| 2003/0100330 A1 | 5/2003 | Tomlinson, Jr. et al. |
| 2003/0106067 A1 | 6/2003 | Hoskins et al. |
| 2003/0224728 A1 | 12/2003 | Heinonen et al. |
| 2004/0032373 A1 | 2/2004 | Petros et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0087214 A1 | 5/2004 | Cho |
| 2004/0107299 A1 | 6/2004 | Lee et al. |
| 2004/0107445 A1 | 6/2004 | Amit |
| 2004/0123322 A1 | 6/2004 | Erkocevic et al. |
| 2004/0125870 A1 | 7/2004 | Yamazaki |
| 2004/0136388 A1 | 7/2004 | Schaff |
| 2004/0158649 A1 | 8/2004 | Ophir et al. |
| 2004/0162117 A1 | 8/2004 | Liebenow |
| 2004/0177381 A1 | 9/2004 | Kliger et al. |
| 2004/0178888 A1 | 9/2004 | Hales et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0203387 A1 | 10/2004 | Grannan |
| 2004/0208167 A1 | 10/2004 | Kishida |
| 2004/0208599 A1 | 10/2004 | Swartz et al. |
| 2004/0235468 A1 | 11/2004 | Luebke et al. |
| 2004/0250273 A1 | 12/2004 | Swix et al. |
| 2004/0255332 A1 | 12/2004 | Bertonis et al. |
| 2004/0259538 A1 | 12/2004 | Agbegnenow |
| 2005/0018648 A1 | 1/2005 | Scheelke |
| 2005/0018857 A1 | 1/2005 | McCarty et al. |
| 2005/0025162 A1 * | 2/2005 | Binder ............... 370/401 |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0073968 A1 | 4/2005 | Perlman |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0114325 A1 | 5/2005 | Liu et al. |
| 2005/0136972 A1 | 6/2005 | Smith et al. |
| 2005/0144647 A1 | 6/2005 | Zussman et al. |
| 2005/0152337 A1 | 7/2005 | Wurtzel et al. |
| 2005/0164666 A1 | 7/2005 | Lang et al. |
| 2005/0181839 A1 | 8/2005 | Tiainen et al. |
| 2005/0226200 A1 | 10/2005 | Askildsen et al. |
| 2005/0226206 A1 | 10/2005 | An |
| 2005/0235333 A1 | 10/2005 | Bertonis et al. |
| 2005/0239400 A1 | 10/2005 | Narikawa |
| 2005/0268322 A1 | 12/2005 | Watson |
| 2005/0289638 A1 | 12/2005 | Steading |
| 2006/0007945 A1 | 1/2006 | Schoettle et al. |
| 2006/0018328 A1 | 1/2006 | Mody et al. |
| 2006/0092967 A1 | 5/2006 | Bergeron et al. |
| 2006/0133465 A1 | 6/2006 | Dockemeyer, Jr. et al. |
| 2006/0152344 A1 | 7/2006 | Mowery, Jr. |
| 2006/0172781 A1 | 8/2006 | Mohebbi |
| 2006/0193336 A1 | 8/2006 | Landry et al. |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye, Jr. |
| 2006/0235333 A1 | 10/2006 | Couvillon, Jr. |
| 2006/0238250 A1 | 10/2006 | Camagna et al. |
| 2006/0251086 A1 | 11/2006 | Ha et al. |
| 2006/0251094 A1 | 11/2006 | Van Vleck et al. |
| 2006/0251179 A1 | 11/2006 | Ghoshal |
| 2006/0274745 A1 | 12/2006 | Wang et al. |
| 2006/0280197 A1 | 12/2006 | Stone |
| 2006/0286958 A1 | 12/2006 | Lee et al. |
| 2006/0291575 A1 | 12/2006 | Berkman et al. |
| 2007/0002772 A1 | 1/2007 | Berkman et al. |
| 2007/0002876 A1 | 1/2007 | Berkman et al. |
| 2007/0019959 A1 | 1/2007 | Retnasothie et al. |
| 2007/0025368 A1 | 2/2007 | Ha et al. |
| 2007/0036171 A1 | 2/2007 | Magin |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0254714 A1 | 11/2007 | Martich et al. |
| 2007/0268886 A1 | 11/2007 | Caspi et al. |
| 2008/0025723 A1 | 1/2008 | Mayer et al. |
| 2008/0062013 A1 | 3/2008 | Face et al. |

FOREIGN PATENT DOCUMENTS

| | | |
|---|---|---|
| EP | 0 798 923 A2 | 10/1997 |
| EP | 0 798 923 B1 | 9/2000 |
| KR | 199822718 | 7/1998 |
| KR | 1020000000152 A | 1/2000 |
| WO | 9623377 A1 | 8/1996 |
| WO | 98/27748 | 6/1998 |
| WO | 98/31133 | 7/1998 |
| WO | WO 99/25098 | 5/1999 |
| WO | WO 99/25098 A1 | 5/1999 |
| WO | 99/35753 | 7/1999 |
| WO | 00/28689 | 5/2000 |
| WO | 01/80030 | 10/2001 |
| WO | 02/19623 | 3/2002 |
| WO | 2004068827 A1 | 8/2004 |
| WO | 2005022692 A2 | 3/2005 |
| WO | 2006/052216 | 5/2006 |

OTHER PUBLICATIONS

Dastangoo, S. et al., "Wireless LAN Technologies and Applications", MILCOM 1993, Conference Record, IEEE, vol. 2, pp. 497-501.

Kelley, J.C. et al., "Power Line Based LAN Applications in Residential Communication and Control", Wireless LAN Implementation, IEEE Conference on Sep. 17-18, 1992, pp. 38-41.

Newbury, J. et al., "Potential Communication Services Using Power Line Carriers and Broadband Integrated Services Digital Network", IEEE Transactions on Oct. 1999, vol. 14, pp. 1197-1201.

Okazaki, H. et al., "A Transmitting and Receiving Method for CDMA Communications Over Indoor Electrical Power Lines", International Symposium on May 31-Jun. 3, 1998, vol. 6, pp. 522-528.

Pahlavan, K. et al., "Trends in Local Wireless Networks", Communications Magazine, IEEE, Issue 3, Mar. 1995, vol. 33, pp. 88-95.

Sado, W.N. et al., "Personal Communication on Residential Power Lines—Assessment of Channel Parameters", Fourth IEEE Interational Conference on Nov. 6-10, 1995, pp. 532-537.

Yi-Fu, Chen et al., "A 100-kbps Power-Line Modem for Household Applications", International Symposium on Jun. 8-10, 1999, pp. 179-182.

Yi-Fu, Chen et al., "Baseband Transceiver Design of a 128-kbps Power-Line Modem for Household Applications", IEEE Transactions, Issue 2, Apr. 2002, vol. 17, pp. 338-344.

Zeino, H. et al., "Functional Approach to a Hybrid Wireless Network fro Mobile Stations", Personal, Indoor and Mobile Radio Communications, Fifth IEEE International Symposium on Sep. 18-23, 1994, vol. 3, pp. 994-998.

Evans, Grayson, *CEBus Standard User's Guide: A Complete Technical Overview*, May 1996, pp. 1-2, 1-3, 2-3, 2-7, 2-8, 2-9, 4-1, 4-2, 5-7, 6-8, 6-9, 6-14 to 6-25, 6-41, 6-42, 6-57 to 6-60, 6-65 to 6-68, 7-38, 7-51 to 7-54.

Office Action from the Korean Patent Office dated Feb. 2, 2007 for application No. KR-10-2002-7014029.

Office Action from the Korean Patent Office dated Jul. 10, 2008 for application No. KR-10-2008-7006206.

Strassberg, Dan; "Home Automation Buses: Protocols Really Hit Home"; EDN Design Feature, Apr. 13, 1995 (9 pages).

Hachman, Mark; "Compaq to Ride The CEBus"; EBN Jan. 22, 1996 (1 page).

Hoffman, J.; "Cable, Television, and the Consumer Electronic Bus"; Panasonic Technologies. Inc., pp. 165-173.

Grayson Evans, The CEBUs Standard User's Guide, 1st edition, May 1996, 317 pages.

IS-60.04; Node Communications Protocol Part 6: Application Layer Specification; Revision Apr. 18, 1996 (129 pages).

Markwalter, Brian et al; "CEBus Router Testing"; IEEE Transactions on Consumer Electronics Nov. 1991, vol. 37, No. 4 (8 pages).

'High-Speed Cable Modems', pp. 1-246 By Albert A. Azzam, 1997, ISBN: 0-07-006417-2 (276 pages).

'High-Speed Cable Modems', pp. 247-570 By Albert A. Azzam, 1997, ISBN: 0-07-006417-2 (321 Pages).

Mark Sumner: "DOCSIS 1.1 Overview" CABLEMODEM.COM—Documents, Online! May 3-7, 1999, pp. 1-16, XP-002165493, http://www.cablemodem.com/Euroll.sub.—Overview.pdf, retrieved on Apr. 18, 2001.

Sdralia et al, "Performance Characterisation of the MCNS DOCSIS 1.0 CATV Protocol with Prioritised First come First Served Scheduling", IEEE Transactions on Broadcasting, US, vol. 45, No. 2, Jun. 1999, pp. 196-205.

Tzerefos et al, "Delivery of Low Bit Rate Isochronous Streams Over the DOCSIS 1.0 Cable Television Protocol", IEEE Transactions on Broadcasting, US, vol. 45, No. 2, Jun. 1999, pp. 206-214.

A.D. Little, S. Lipoff: "Cable Modem Termination System—Network Side Interface Specification" Data Over Cable Interface Specification, Online 1996, pp. 1-17, XP002165494, http://www.cablemodem.com/SP.sub.—CMTS.sub.—NSII01-960702.pdf, retrieved on Apr. 18, 2001.

M. Laubach, "To foster residential area broadband internet technology: IP datagrams keep going, and going, and going . . . ", Computer Communications, NL, Elsevier Science Publishers BV, Amsterdam, vol. 19, No. 11, Sep. 1, 1996, pp. 867-875.

Goldberg, "MCNS/DOCSIS Mac Clears a Path for the Cable-Modem Invasion", Electronic Design, US, Penton Publishing, vol. 45, No. 27, Dec. 1, 1997, pp. 69-70, 74, 78, 80.

Quigley, "Cablemodem Standards for Advanced Quality of Service Deployments", Digest of Technical Papers, International Conference on Consumer Electronics, Jun. 22-24, 1999, pp. 282-283.

Cable Television Laboratories, Inc., "Data-Over-Cable Service Interface Specifications: Baseline Privacy Plus Interface Specification", SP-BPI+-I09-020830, Aug. 30, 2002.

Cable Television Laboratories, Inc., "Data-Over-Cable Service Interface Specifications: Radio Frequency Interface Specification", SP-RFIv1.1-I09-020830, Aug. 30, 2002.

Cable Television Laboratories, Inc., "Data-Over-Cable Service Interface Specifications: Radio Frequency Interface Specification", SP-RFIv2.0-I03-021218, Dec. 18, 2002.

Cisco, "Internal DOCSIS Configurator File Generator for the Cisco Cable Modem Termination System", Cisco Cable Modem Termination System Feature Guide, Chapter 6.

Communications Technology, "Cable Modem Security: Insulating Your Network While Keeping Your Subscribers Safe from Each Other", Oct. 2001.

Croft et al, "Bootstrap Protocol (BOOTP)", Sep. 1985.

Droms, "Dynamic Host Configuration Protocol", Mar. 1997.

Jacobs, et al, "Bandwidth Burglary in Broad Daylight: How to Prevent a Simple Hack", Jan. 2003.

Pfendtner, "DOCSIS Network Security at WH-Netz", Nov. 20, 2002.

Society of Cable Telecommunications Engineers, Inc., "Data-Over-Cable Service Interface Specification: DOCSIS 1.0 Radio Frequency Interface (RFI)", ANSI/SCTE 22-1 2002 (formerly DSS 02-05).

"MCNS Data-Over-Cable Service Interface Specifications: Baseline Privacy Interface Specification SP-BPI-I02-990319", Mar. 1999.

Cable Television Laboratories, Inc.; Data-Over-Cable Service Interface Specifications—Radio Frequency Interface Specificiation—SP-RFI-104-980724; 1997; pp. 1-196.

"MCNS Data-Over-Cable Service Interface Specifications: Cable Modem to Customer Premise Equipment Interface Specification SP-CMCI-I04-000714", Jul. 2000.

"Data-Over-Cable Service Interface Specifications; Cable Modem Termination System—Network Side Interface Specification, SP-CMTS-NSII01-960702", Jul. 1996.

Data-Over Cable Service Interface Specifications; Radio Frequency Interface Specification; SPRFIv1.1-101-990311; 1999; Cable Television Laboratories, Inc.; pp. 1-310.

Ciciora, W., et al., "Protocol Issues," Modern Cable Television Technology: Video, Voice, and Data Communications, Section 4.4, pp. 194-205, Copyright 1999 by Morgan Kaufmann Publishers, Inc.

Ciciora, W., et al, "Chapter 4.5: The DOCSIS Protocol for Cable Modems," Modern Cable Television Technology: Video, Voice, and Data Communications, Section 4.5, pp. 205-213, Copyright 1999 by Morgan Kaufmann Publishers, Inc.

Data-Over Cable Technical Reports; Operations Support System Framework for Data Over Cable Services; TR-DOCS-OSSIW08-961016; MCNS Holdings, LP; pp. 1-20.

Data-Over Cable Service Interface Specifications; Operations Support System Interface Specification; SP-OSSI-102-990113; Cable Television Laboratories, Inc.; pp. 1-26.

Data-Over Cable Service Interface Specifications; Operations Support System Interface Specification Radio Frequency Interface; SP-OSSI-RFI-I03-990113; Cable Television Laboratories, Inc.; pp. 1-29.

Data-Over Cable Service Interface Specifications; Operations Support System Interface Specification Baseline Privacy Interface MIB; SP-OSSI-BPI-I01-980331; 1997 & 1998; MCNS Holdings, LP; pp. 1-33.

Extended DQRAP (EXQRAP) A Cable TV Protocol Functioning as a Distributed Switch; Chien-Ting Wu & Graham Campbell; Illinois Institute of Technology (Comp. Science Dept.); pp. 1-7.

A Review of Contention Resolution Algorithms for IEEE 802.14 Networks; Nada Glomie; Yves Saintillan, & David H. Su; National Institute of Standards and Technology; pp. 1-11.

A Review of Contention Resolution Algorithms for IEEE 802.14 Networks; Nada Glomie; Yves Saintillan, & David H. Su; National Institute of Standards and Technology; pp. 1-12.

On IEEE 802.14 Medium Access Control Protocol; Ying-Dar Lin; 1998.

On IEEE 802.14 Medium Access Control Protocol; Ying-Dar Lin; 1998; IEEE Communications Survey Fourth Quarter pp. 2-10.

Hybrid-Fiber Coax; Hung Nguyen and Felix Yao; Apr. 22, 1996; pp. 1-11.

Cable Data Modem Performance Evaluation, A Primer for Non-Technical Readers; Cable Television Laboratories, Inc.; Nov. 15, 1996; pp. 1-8.

Data-Over Cable Service Interface Specficiations; Cable Modem to Customer Premise Equipment Interface Specification; SP-CMCI-12-9803171; 1988; Cable Television Laboratories, Inc.; pp. 1-40.

Cable Device Management Information Base for DOCSIS Complaint Cable Modems and Cable Modem Termination Systems; Michael St. Johns; Mar. 30, 1999; pp.1-54.

Data-Over Cable Service Interface Specifications; Cable Modem Telephony Return Interface Specification; SP-CMTRI-101-970804; 1997; Cable Television Laboratories, Inc.; pp. 1-74.

Radio Frequency (RF) Interface Management Information Base for MCNS Complaint RF Interfaces Draft-ietf-Jipcdn-rf-interface-mib-04.txt; May 22, 1009; Guenter Roeck (editor); pp. 1-55.

Cable Device Management Information Base for MCNS Complaint Cable Modems and Cable Modem Termination Systems draft-ietf-ipcdn-cable-device-mib-04.txt; May 22, 1998; Guenter Roeck (editor); pp. 1-32.

Baseline Privacy Interface Management Information Base for MCNS Complaint Cable Modems and Cable Modem Termination Systems; R. Woundy; Jan. 17, 1999; pp. 1-35.

Logical IP Subnetworks over IEE 802.14 Services; Mark Laubach; Mar. 13, 1998; pp. 1-13.

MAC Protocols for Multimedia Data over HFC Architecture: Dolors Sala Batlle; Nov. 27, 1995; pp. 1-28.

An Access Protocol to Support Multimedia Traffic Over Hybrid Fiber/Coax Systems; John O. Limb, Dolors Sala; pp. 1-6.

Radio Frequency (RF) Interfaces Management Information Base for MCNS/DOCSIS Compliant RF Interfaces; Mike St. Johns, (Editor); Feb. 17, 1999; pp. 1-67.

Telephony-Return Interface (TRI) Management Information Base for DOCSIS complaint Telephony-Return Cable Modems and Cable Modem Termination systems; S. Adiraju, J. Fijolek; Apr. 2, 1999; pp. 1-27.

Data Over Cable System Quality of Service Management Information Base (DOCSIS-QOS MIB); M. Patrick, J. Harvey, Motorola ING; Jun. 25, 1999, pp. 1-43.

Docsis 1.1 IGMP MIB; H. Abramson, Motorola; Jun. 1999; pp. 1-13.

Scheduling Disiciplines for HFC Systems: What can we learn from ATM scheduling; Dolors Sala, John O. Limb; GA Tech; pp. 1-6.

A Protocol for Efficient Transfer of Data over Fiber/Cable Systems; Dolors Sala, John O. Limb; GA Tech; pp. 1-8.

EIA-600.35 RF Physical Layer and Medium Specification; Revision: IS-60, Aug. 30, 1995 (17 pages).

EIA-600.37 Symbol Encoding Sublayer; Revision: Nov. 15, 1991; May 12, 1995 Draft Copy (30 pages).

EIA-600.38 Power Line / RF Symbol Encoding Sublayer; Revision Nov. 15, 1991; May 12, 1995 Draft Copy (64 pages).

EIA 600.81 Common Application Language (CAL) Specification; Revision SP3484 Rev Sep. 17, 1996 (126 pages).

EIA 600.82 CAL Context Description; Revision SP3485 Rev Feb. 2, 1996 (17 pages).

Draft IS-60.04 Node Communications Protocol Part 6: Application Layer Specification; Revision Apr. 18, 1996 Draft Copy (129 pages).

EIA 600.42 Node Medium Access Control Sublayer; Revision IS-60 Feb. 22, 1996 (54 pages).

EIA 600.41 Description of the Data Link Layer; Revision IS-60 Jan. 31, 1996 (60 pages).

Home Automation Buses: Protocols Really Hit Home; EDN Apr. 13, 1995 (9 pages).

POWERHOUSE Wireless Remote Controls; date unknown (3 pages).

POWERHOUSE Wireless Wall Switches; date unknown (3 pages).

EIA-600.10 Introduction to the CEBus Standard; revision Feb. 5, 1995 Draft Copy (19 pages).

Mark Hachman, Compaq to Ride The CEBus; EBN Jan. 22, 1996 (1page).

CEBus Router Testing; IEEE transactions on Consumer Electronic Nov. 1991, vol. 37 No. 4 (8 pages).

JVC VIPSLAN-10 Infrared Wireless LAN system; date unknown (10 pages).

Peter Clegg, VIPSLAN-10 Streaks Off the Wire; LAN Times Dec. 18, 1995 (1 page).

VIPSLAN-10; Source LAN Magazine, Sep. 1995 (11 pages).

JVC Introducing VIPSLAN-10; date unknown (2 pages).

JVC Satellite; date unknown (2 pages).

JVC Node; date unknown (2 pages).

JVC Station; date unknown (2 pages).

JVC PC Card & Mobile; date unknown (2 pages).

JVC Power Hub; date unknown (1 page).

JVC T-Adapter; date unknown (1 page).

Optical wireless Systems and Networks; IEEE Communications Dec. 1998 vol. 36 No. 12 p. 70-71 (4 pages).

GSM Over Ethernet; IEE Review Mar. 2002 (6 pages).

High Cost Of Woring Sparks Wireless LAN Alternatives; Computer Technology review vol. XIV No. 3, Mar. 1994 (8 pages).

J. Hofmann, cable, Television, and the Consumer Electronic Bus; date unknow (9 pages).

VISPLAN-10 Infrared Wireless LAN system; JVC May 1996 (10 pages).

'JVC introduces Ethernet compatible wireless LAN system'; Business Wire Sep. 26, 1995 (1 page).

Ethernet Wireless LAN Systems; BYTE Feb. 1996 (3 pages).

'JVC introduces first Ethernet compatible wireless LAN system'; Business Wire Nov. 8, 1995 (1 page).

Zeino, H.; Misson.; "Functional Approach to a Hybrid Wireless Network for Mobile Station"; Personal, Indoor and Mobile Radio Communications, 1994. 5th IEEE International Symposium on Sep. 18-23, 1994; vol. 3, pp. 994-998.

Pahlavan, K.; Probert, T.H.; Chase, M.E.; "Trends in Local Wireless Networks"; Communications Magazine, IEEE, Issue: 3, Mar. 1995, vol. 33, pp. 88-95.

Dastangoo, S.; Eftekari, R.; Tran, H.; "Wireless LAN Technologies and Application"; MILCOM '93. Conference record. IEEE vol. 2, pp. 497-501.

Lior Ophir; Yigal Bitran; "802.11 Over Coax—A Hybrid Coax—Wireless Home Network Using 802.11 Technology"; Texas Instruments, 6 pages.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

* cited by examiner

FIGURE 1 (PRIOR-ART)

FIGURE 2 (PRIOR-ART)

FIGURE 3 (PRIOR-ART)

FIGURE 4 (PRIOR-ART)

NETWORK COMBINING WIRED AND NON-WIRED SEGMENTS

CROSS-REFERENCE TO RELATED APPLICATION

This application is a continuation of U.S. application Ser. No. 10/998,015, filed on Nov. 29, 2004; which is a continuation of U.S. application Ser. No. 10/890,199, filed on Jul. 14, 2004; which is a continuation of U.S. application Ser. No. 09/552,564, filed on Apr. 19, 2000, now U.S. Pat. No. 6,842,459, issued: Jan. 11, 2005, the disclosures of which are incorporated herein by reference

FIELD OF THE INVENTION

The present invention relates to the field of communication networks, and, more specifically, to the networking of devices within a building via combined wired and non-wired communication.

BACKGROUND OF THE INVENTION

There is a growing need for networking within the home. This need is driven by two major factors, the increasing use of multiple data devices and the emergence of broadband services in the home.

Lately there has been an expansion in the number of homes in the USA with multiple personal computers. In addition, connectivity and networking capabilities have been added to appliances, such as refrigerators and microwave ovens. Furthermore, there is a trend toward enabling data connectivity among various multimedia (audio and video) appliances such as TV's, VCR's, receivers, and speakers. The term "data unit" as used herein denotes any device capable of generating and/or receiving data. The networking of data units enables the sharing of files and applications as well as the sharing of common peripheral devices, along with other benefits.

Another driving force behind the need for home connectivity products is the growth in the number of on-line households. As high-speed connections to information and broadband entertainment sources soar, there is a growing need to share and distribute this access among appliances within the house. These broadband services are supplied mainly by three types of service providers:
1. Telco's, via xDSL connections (currently ADSL, to be followed by VDSL).
2. CATV. Currently via Cable-Modem, to be followed by digital Set-Top-Box.
3. Wireless connections, such as Satellite, LMDS, WLL, and others.

Communication within a home can be classified into two types: wired and non-wired. These are covered below:

Wired Communication

Wired communication requires using at least two distinct electrical conductors. The wiring can be new wiring installed and dedicated for data communication within the home, such as installing structured wiring such as Category 5 type, used in Ethernet IEEE802 networks. However, the installation of a new wiring structure within a home is labor-intensive, complex, and expensive. Alternatively, existing home wiring, which was previously installed for a specific purpose, can be used for data communication without substantially affecting or degrading the original service. Existing wiring includes telephone wiring, power line wiring, and cable TV wiring. These are reviewed below.

For all wired configurations, the present invention relies upon electrically-conducting lines which may be pre-existing within a building, which have at least two distinct electrical conductors, and which are capable of transporting data communication signals. Furthermore, the present invention relies upon suitable outlets, to which the electrically-conducting lines are coupled, and which are capable of connecting to external devices.

Telephone Wiring

In-home telephone service usually employs two or four wires, and is accessed via telephone outlets into which the telephone sets are connected.

FIG. 1 shows the wiring configuration of a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, which establishes and enables telephony from one telephone to another. The term "analog telephony" as used herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" as used herein denotes any frequency substantially above such analog telephony audio frequencies, such as that used for data. ISDN typically uses frequencies not exceeding 100 KHz (typically the energy is concentrated around 40 Khz). The term "telephone line" as used herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" as used herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new in the home. A plurality of telephones 13a and 13b connects to telephone lines 5 via a plurality of telephone outlets 11a, 11b, 11c, and 11d. Each outlet has a connector (often referred to as a "jack"), denoted in FIG. 1 as 12a, 12b, 12c, and 12d, respectively. In North-America, RJ-11 is commonly used. Each outlet may be connected to a telephone unit via a connector (often referred to as a "plug"), denoted in FIG. 1 (for the two telephone units 13a and 13b illustrated) as 14a and 14b, respectively. It is also important to note that lines 5a, 5b, 5c, 5d, and 5e are electrically the same paired conductors.

While network 10 exhibits serial or daisy-chained topology wherein the wiring is serialized from an outlet the next one only, other topologies such as star, tree or any arbitrary topology may also exist. However, the telephone wiring system within a residence is always composed of wired media: two or four copper wires, and several outlets which provides direct access for connecting to these wires.

There is a requirement for simultaneously using the existing telephone infrastructure for both telephone and data networking. In this way, the task of establishing a new local area network in a home or other building is simplified, because there would be no additional wires to install. U.S. Pat. No.

4,766,402 to Crane (hereinafter referred to as "Crane") teaches a way to form LAN over two-wire telephone lines, but without the telephone service.

As an another example, relevant prior-art in this field is disclosed in U.S. Pat. No. 5,896,443 to Dichter (hereinafter referred to as "Dichter"). Dichter suggests a method and apparatus for applying frequency domain/division multiplexing (FDM) technique for residential telephone wiring, enabling simultaneously carrying telephone and data communication signals. The bandwidth enabled by the wiring is split into a low-frequency band capable of carrying an analog telephony signal and a high-frequency band capable of carrying data communication signals. In such mechanism, the telephone service is not affected, while data communication capability is provided over existing telephone wiring within a home.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems.

The Dichter network is illustrated in FIG. 2, which shows a network 20 serving both telephones and providing a local area network of data units. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers (the term "transceiver" herein denotes a combined transmitter and receiver). DCE units 23a, 23b, and 23c are respectively connected to high pass filters (HPF) 22a, 22b, and 22c. The HPF's allow the DCE units access to the high-frequency band carried by telephone-line 5. In a first embodiment (not shown in FIG. 2), telephones 13a, 13b, and 13c are directly connected to telephone line 5 via connectors 14a, 14b, and 14c, respectively. However, in order to avoid interference to the data network caused by the telephones, in a second embodiment (shown in FIG. 2) low pass filters (LPF's) 21a, 21b, and 21c are added to telephones 13a, 13b, and 13c from telephone line 5. Furthermore, a low pass filter is also connected to Junction Box 16, in order to filter noises induced from or to the PSTN wiring 17. It is important to note that lines 5a, 5b, 5c, 5d, and 5e are electrically the same paired conductors.

Additional prior-art patents in this field can be found under US Class 379/093.08, which relates to carrying data over telephone wiring without any modifications made to the telephone wiring (e.g. wires and outlets). U.S. Pat. No. 5,841,360 and U.S. patent application Ser. Nos. 09/123,486 and 09/357,379 to the present inventor are the first to suggest modifying the telephone wiring, by means of splitting the wiring into distinct segments, each of which connects two telephone outlets. In this way, the network is modified from 'bus' topology into multiple 'point-to-point' segments, enabling superior communication characteristics.

Part of such a network 30 is shown in FIG. 3, describing outlets 31a and 31b, substituting outlets 11 of FIGS. 1 and 2. The telephone wiring 5 is split into distinct segments 5a, 5b and 5c. Low-Pass Filter (LPF) and High-Pass Filters (HPF) are coupled to each wire segment end, in order to split between the telephony and the data signals. As shown in FIG. 3, LPF's 21b and 21c are attached to each end of wiring segment 5b. The LPF's are designed to allow passing of the telephony signals, and are connected together thus offering a continuous path for the telephony signals. Access to the telephony signals is made via connectors 12a and 12b in the outlets, into which telephone devices 13a and 13b are connected via connectors 14a and 14b respectively. Thus, the telephone service is fully retained. The data signals, carried in the high part of the spectrum, are accessed via HPF's 26a and 22b, coupled to each end of the telephone wire segment 5b. HPF's 22a and 26b are connected to the ends of the wire segments 5a and 5c respectively. Each HPF is connected to a modem 23 and 27, which transmit and receive data signals over the telephone wiring. Modems 23a, 27a, 23b, and 27b are connected to HPF's 22a, 26a, 22b and 26b respectively. Data units 24a and 24b are connected to the outlets 31a and 31b respectively, via a connector (not shown in the Figure) in the outlet. The data units are coupled via DTE interface in the outlet. Outlets 31a and 31b comprise DTE interfaces 29a and 29b respectively. The three data streams in each outlet, two from each modem and one from the DTE, are handled by an adapter 28a and an adapter 28b, which serve outlets 31a and 31b, respectively. While FIG. 3 describes an embodiment wherein all the components for the relevant functions are housed within the outlet, other embodiments are also possible, wherein only some of the components for these functions are contained within the outlet.

Power Lines

It is possible to transmit data over wiring used for distribution of electrical power within the home, which is normally at a frequency of 50 or 60 Hz. Access to the power is available via power outlets distributed around the house. Such wiring consists of two wires (phase and neutral) or three wires (phase, neutral, and ground).

FDM techniques, as well as others, are used for enabling data communication over power lines. Many prior-art patents in this field can be found in US Class 340/310.

Cable Television Lines

It is also possible to transmit data over wiring used for the distribution of television signals within the home. Such wiring usually is coaxial cable.

Both power line and cable television wiring systems resemble the telephone line structure described in FIG. 1. The wiring system is based on conductors, usually located in the walls, and access to these wires is obtained via dedicated outlets, each housing a connector connected directly to the wires. Common to all these systems, is the fact that the wiring was installed for a dedicated purpose (telephone, power, or cable TV signal distribution). Wherever one of these existing wiring systems is used for carrying data, it is desirable that the original service (telephony, power, or television signal distribution) be unaffected. Dedicated modems are used for carrying data over the media concurrently with the original service.

When using existing wiring, specific wired modems are normally required for communicating over the electrically-conducting lines, and access to the electrically-conducting lines is provided via the relevant outlets. Using electrically-conducting lines as the communication media allows for high bandwidth, and provides robust and cost-effective communication. In addition, communication over large distances is possible, which in most cases enables coverage of the whole house, thereby guaranteeing communication from any outlet to another within the house.

Such networks, however, require data units to be connected to the outlets, usually by means of a cable from the data unit to a suitable nearby outlet. This makes the connection complex and hard-to-use, requires the data unit to be in proximity to an appropriate outlet, and impairs mobility for some data units within the house.

Non-Wired Communication

Non-wired solutions for in-home data networking use waves propagated without an electrically-conducting medium. Three main techniques are commonly used:

1. Radio Frequency (RF). Transmission of data between data units can be accomplished with radio frequency electromagnetic signals. As an example, IEEE802.11 can be used.
2. Light. Transmission of data between data units can be accomplished with light in the visible or non-visible spectrum. Currently, the most popular is infrared (IR) based communication. Most such systems require 'line-of-sight' placement of the communicating data units.
3. Sound. Transmission of data between data units can be accomplished with sound waves, either in the audio spectrum (20-20,000 Hz), or inaudible spectrum (ultrasonic, above 20,000 Hz; or infrasonic, below 20 Hz).

It is noted that although light and radio waves are both electromagnetic phenomena, they occupy different parts of the electromagnetic spectrum and have significantly different characteristics for purposes of the present invention. Thus, light and radio waves are herein treated as distinct physical phenomena.

An example of a non-wired data network 40 is shown in FIG. 4. Two data units 41a and 41b are shown, into which non-wired transceivers 42a and 42b are respectively coupled. The non-wired transceivers 42a and 42b communicate over a space 43 without any electrically-conducting medium. If RF transmission is used, the transceivers are RF transceivers, and the communication over space 43 is based on the propagation of radio frequency electromagnetic waves. Similarly, in the case of light-based communication, transceivers 42a and 42b utilize light emitters (e.g. LEDs) and light detectors (e.g. photoelectric cell), and the communication over space 43 relies on the propagation of light. Likewise, in the case of sound-based communication over space 43, the transceivers use microphones and speakers, and the communication relies on the propagation of sound waves through the air in the space 43.

Since these solutions do not require any physical connection such as cable, they provide both ease-of-use and mobility. However, such non-wired solutions are effective over short distances only. Furthermore, most of the non-wired solutions cannot easily pass through walls and other such obstructions, owing to the attenuation to the signals. Hence, such techniques are suitable for communication within a single room, but are not suitable for communication between the rooms of a home or other building.

There is thus a widely recognized need for, and it would be highly advantageous to have, a means for implementing a data networking in-home between data units, wherein such data units can be networked within a home or other building, while providing mobility and ease of use. This goal is met by the present invention.

SUMMARY OF THE INVENTION

The present invention discloses a data communication network within a building having wired and non-wired segments. The wired segments are based on electrically-conducting lines installed within the building. In addition to supporting data communication, these electrically-conducting lines concurrently distribute a primary service other than the transport of data communication signals, such as telephone service, electrical power service, or cable television service, and may be pre-existing wires originally-installed to distribute the primary service. Dedicated outlets are used to enable direct access to the wiring. The present invention uses means for utilizing the electrically-conducting lines concurrently for both the transport of data communication signals and the primary service, without any interference between these two uses. The non-wired segments employ communication without electrically-conducting media, via waves propagated through open space, such as by light or radio waves, or by acoustic waves in air.

The wired and non-wired segments are combined by means of circuitry in one or more outlets. The coupling device is a module containing one port for coupling to the wired network using a specific wired modem. Another port of the device couples to the non-wired segment, using a non-wired modem. An adapter handles the data flow between the wired segment and the non-wired segment, and has provision for protocol conversion, if required.

The module coupling both segments, or any of the components of the module, can be fully integrated into the outlet, partially integrated into the outlet, or externally coupled to it.

Therefore, according to the present invention there is provided a local area network within a building for transporting data among a plurality of data units, the local area network including at least one wired segment and at least one non-wired segment, wherein the at least one wired segment includes: (a) at least one electrically-conducting line within the building, the electrically-conducting line having at least two conductors and operative to transport data communication signals; (b) at least two outlets, each operative for coupling to the electrically-conducting line; and (c) at least one wired modem coupled to the electrically-conducting line, operative to communicate over the electrically-conducting line; (d) and wherein the at least one non-wired segment is operative to communicating data without electrically-conducting media and includes at least one non-wired modem, wherein at least one of the outlets couples a wired segment to a non-wired segment, and wherein the at least one electrically-conducting line is furthermore operative for concurrently distributing a service other than the transport of data communication signals.

BRIEF DESCRIPTION OF THE DRAWINGS

The invention is herein described, by way of example only, with reference to the accompanying drawings, wherein.

DETAILED DESCRIPTION OF THE INVENTION

Figure 1:
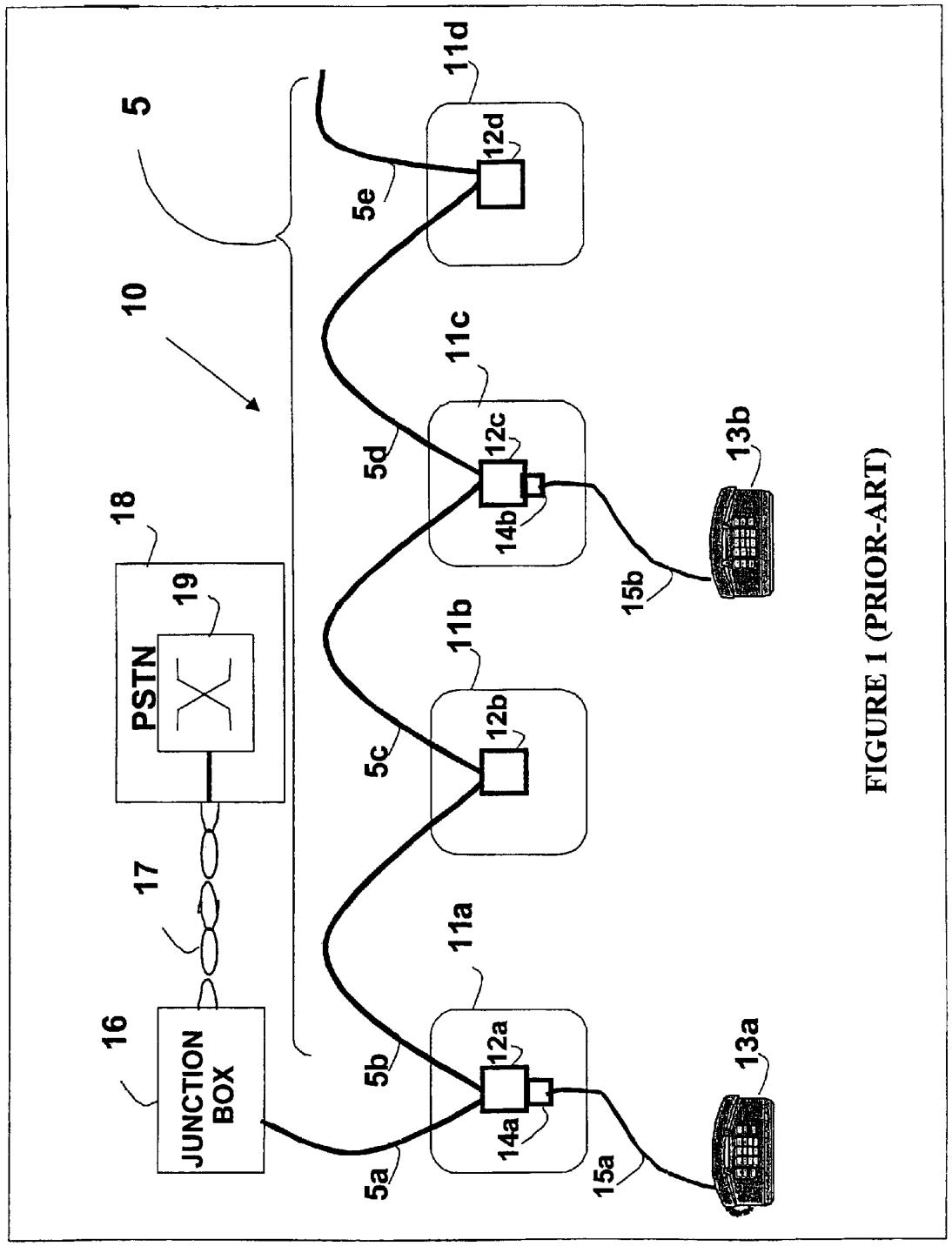
FIG. 1 shows a common prior art telephone line-wiring configuration for a residence or other building.
Figure 2:
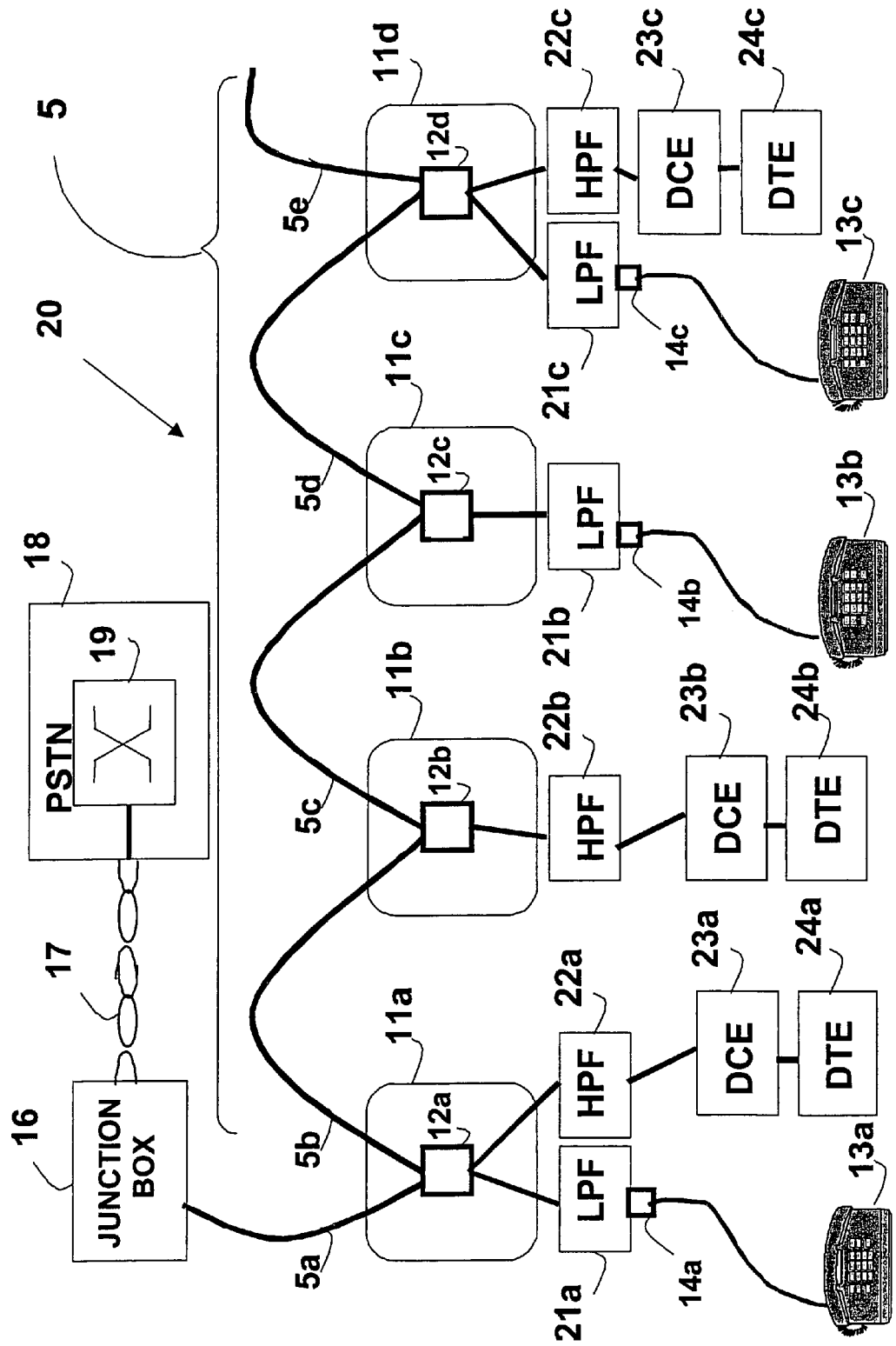
FIG. 2 shows a first prior art local area network based on telephone line wiring for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 5:
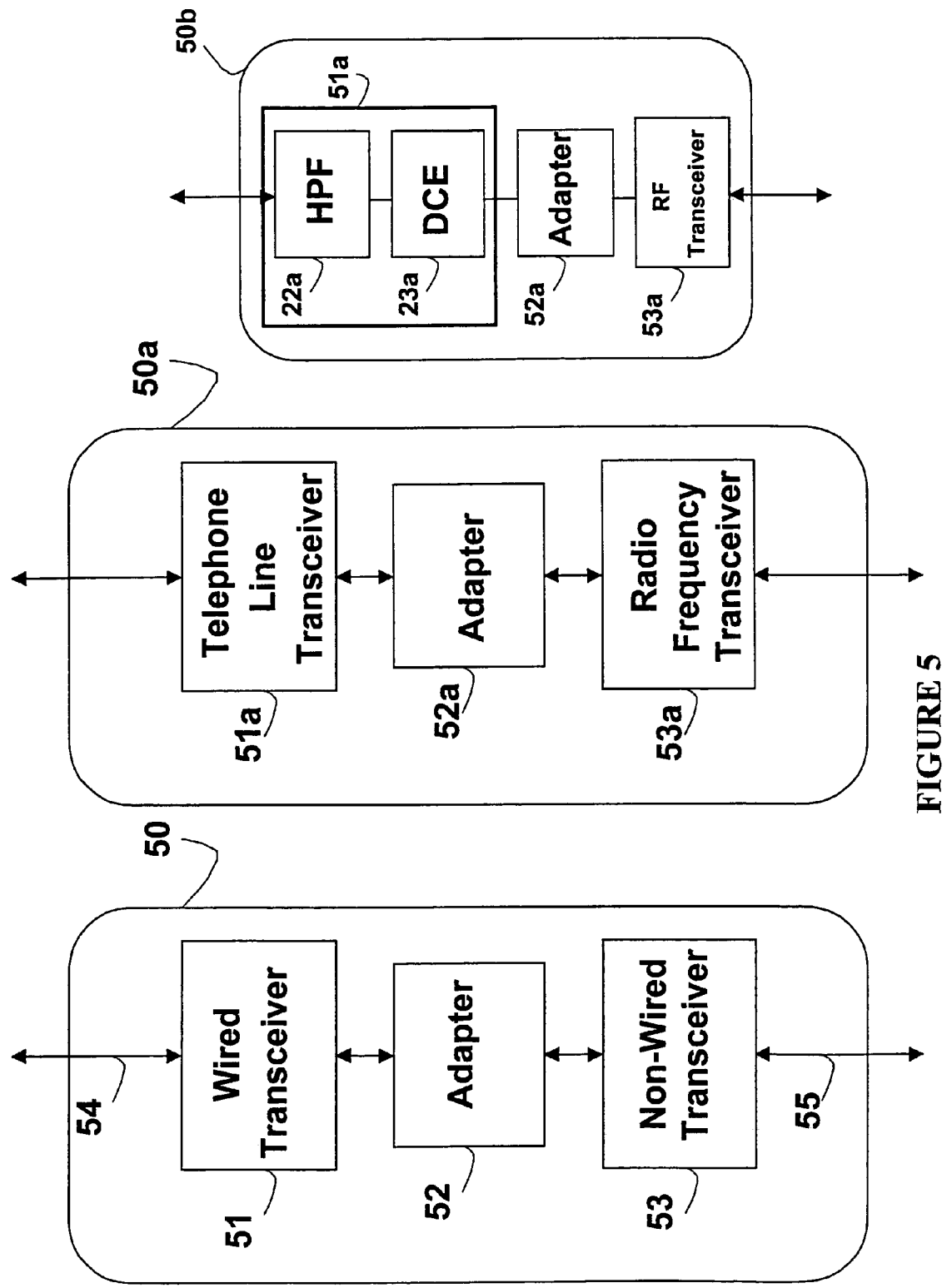
FIG. 5 shows modules according to the present invention.

The invention is based on a wired/non-wired network adapter module (hereinafter referred to as "module"). A functional description of such a module 50 is shown in FIG. 5. The module comprises a physical port 54 for connecting to the wired network. The communication with the wired network is carried by wired transceiver 51. Wired transceiver port 54 and transceiver 51 are dependent upon the type of wired network. Interfacing a telephone line-based network requires a telephone line transceiver, while connecting to a power line network requires a power line dedicated modem. Additionally, the connection to the wired network may require specific means in order to meet regulatory and safety requirements, as well as specific means for ensuring that the basic service (e.g. telephony service, power distribution) is not substantially degraded or affected.

The non-wired segment interfaces via a port 55. Port 55 communicates without an electrically conducting medium. Communication with this non-wired segment is handled by a non-wired modem/transceiver 53. The term "non-wired modem" herein denotes any device capable of data communication without requiring an electrically conducting medium. The data to and from the wired segment and the data to and from the non-wired segment are handled by a protocol adapter 52. Protocol adapter 52 may serve as a transparent unit, acting as a repeater/regenerator, dealing with the physical layer only of the OSI model. However, higher layers can also be handled by the protocol adapter 52. In such a case, the protocol adapter will function as a bridge, router, gateway or any other adaptation mechanism as required.

Other facilities of module 50 may contain logic, control, processing, storage, power-supply and other components not shown in FIG. 5. The communication supported by module 50 can be simplex (unidirectional, either from the wired towards the non-wired segment or vice-versa), half-duplex, or full duplex. A module 50a connects a telephone line network segment to an RF network segment. Module 50a employs a telephone line modem 51a as the wired network interface, a radio-frequency modem 53a as an interface to the non-wired network segment, and a protocol adapter 52a. A module 50b is an embodiment of the present invention, in which the telephone line transceiver can be implemented by a high-pass filter (HPF) 22a and data terminal equipment (DCE) 23a, as also used by Dichter as discussed previously.

Figure 6:
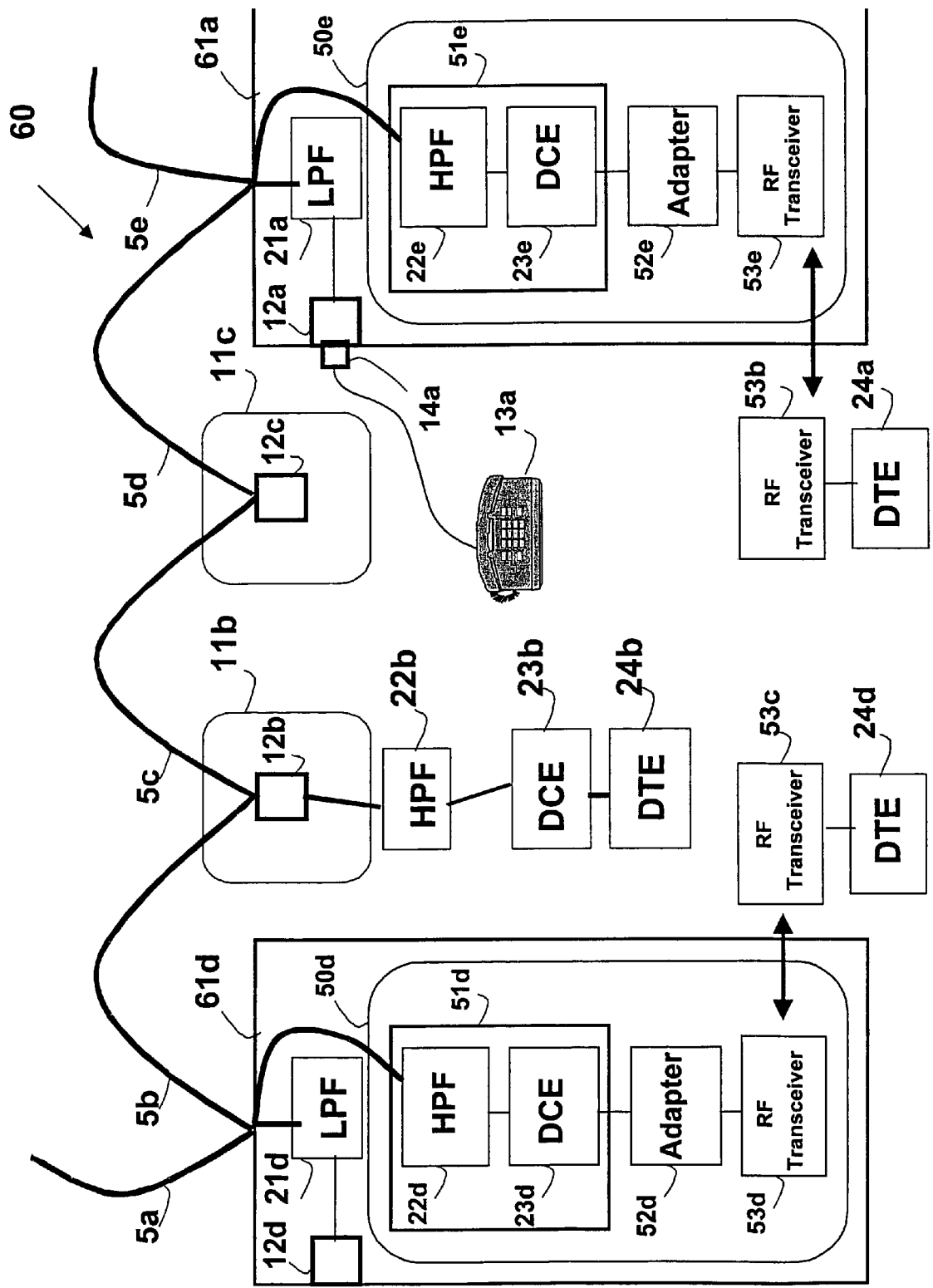
FIG. 6 shows a local area network according to the present invention, wherein telephone wiring used for the wired segment and radio-frequency communication for the non-wired segment.

FIG. 6 shows an embodiment of a network 60 according to the present invention that includes wired and non-wired segments. The wired segment is based on telephone wiring 5 within a building as described in FIG. 1. While outlets 11b and 11c are unchanged, outlets 11a and 11d are replaced by outlets 61d and 61a, respectively, containing modules 50d and 50e respectively. Basic telephone service is retained by employing low-pass filters (LPF) 21d and 21a in outlets 61d and 61a respectively. The LPF's are coupled to telephone connectors 12d and 12a respectively, enabling connection of telephone devices. This is illustrated by a telephone 13a connected by connector 14a to connector 12a in outlet 61a. A Dichter-type data communication network is established by connecting data terminal equipment (DTE) via a modem and HPF, as illustrated by DTE 24b connected to DCE 23b, which is coupled to HPF 22b, which is in turn directly coupled to telephone wiring 5 via connector 12b in outlet 11b.

The non-wired part of network 60 is based on radio frequency transmission, utilizing a pair of RF transceivers 53 (FIG. 5). As shown in FIG. 6, DTE's 24d and 24a are coupled to RF transceivers 53c and 53b, respectively. In turn, each such RF transceiver communicates with RF transceivers 53d and 53a, respectively, which are integrated within outlets 61d and 61a, respectively.

Integrating the wired and non-wired segments of the network is accomplished by modules 50d and 50e, each of which is illustrated by module 50c in FIG. 5. Modules 50d and 50e are integrated within outlets 61d and 61a, respectively. Each such module interfaces the wired segment of the network by a telephone modem. Each such modem contains a high-pass filter 22 and DCE 23, as described previously for a Dichter-type network. Interfacing to the non-wired segment of network 60 is performed via an RF transceiver, wherein modules 50d and 50e comprises RF transceivers 53d and 53e respectively. Protocols and data conversion between both segments are performed by adapter 52 (FIG. 5), wherein adapters 52d and 52e are integrated within modules 50d and 50e respectively.

Network 60 allows DTE's 24d, 24b and 24a to communicate among themselves. While DTE 24b is connected to the network via a wired connection, DTE's 24d and 24a can communicate in a non-wired manner. While FIG. 6 illustrates a single DTE connected by wires and two DTE's connected without wires, it is obvious that any number of DTEs of each type can be connected. Furthermore, while in network 60 each outlet supports a single wired or non-wired DTE connection, other implementations can also be supported. For example, an outlet can provide one or more wired connections simultaneously with one or more non-wired connections.

While FIG. 6 illustrates the case where module 50 is integrated in an outlet 61, embodiments of the present invention also include those wherein the module is external to the outlet. Similarly, selective parts of a module may be integrated within an outlet while other parts are external. In all cases, of course, appropriate electrical and mechanical connection between the module and the outlet are required.

A network outlet is physically similar in size, shape, and overall appearance to a standard outlet, so that a network outlet can be substituted for a standard outlet in the building wall. No changes are required in the overall telephone line layout or configuration.

Network 60 provides clear advantages over hitherto proposed networks. For example, DTEs (e.g. PC's) located in different rooms can interconnect without the need to use any wires. A radio-frequency transceiver in each DTE communicates with the nearest outlet, and the outlets communicate between rooms over the telephone wiring media.

Figure 3:
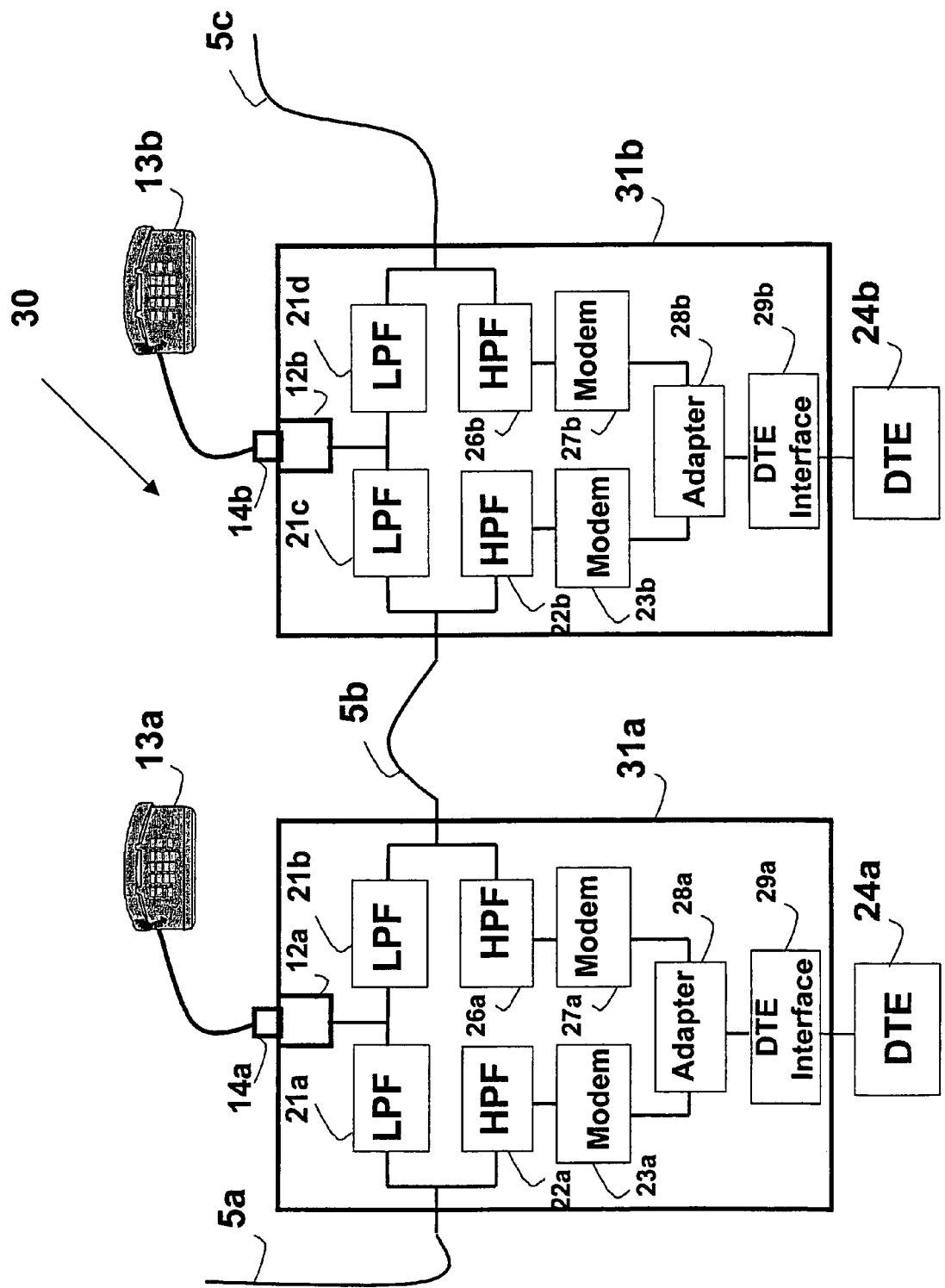
FIG. 3 shows a second prior art local area network based on telephone line wiring for a residence or other building.
Figure 4:
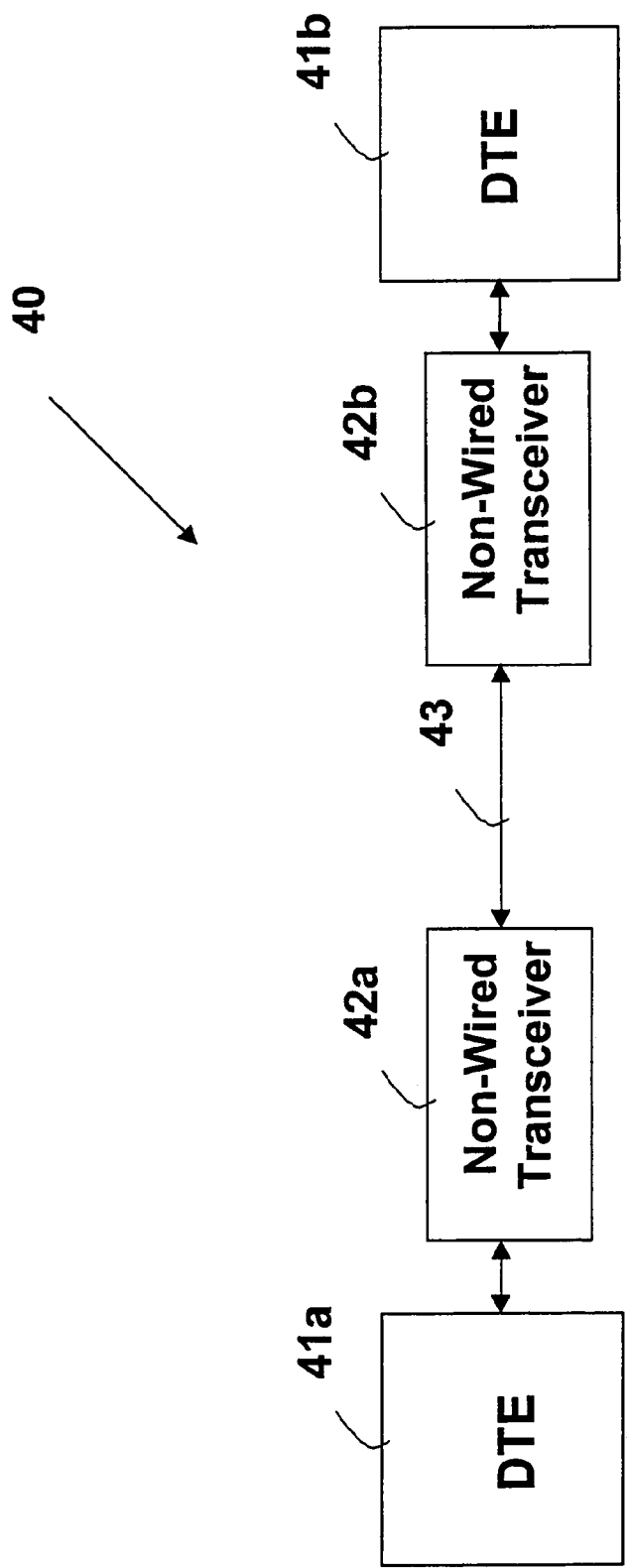
FIG. 4 shows a prior art non-wired communication network.
Figure 7:
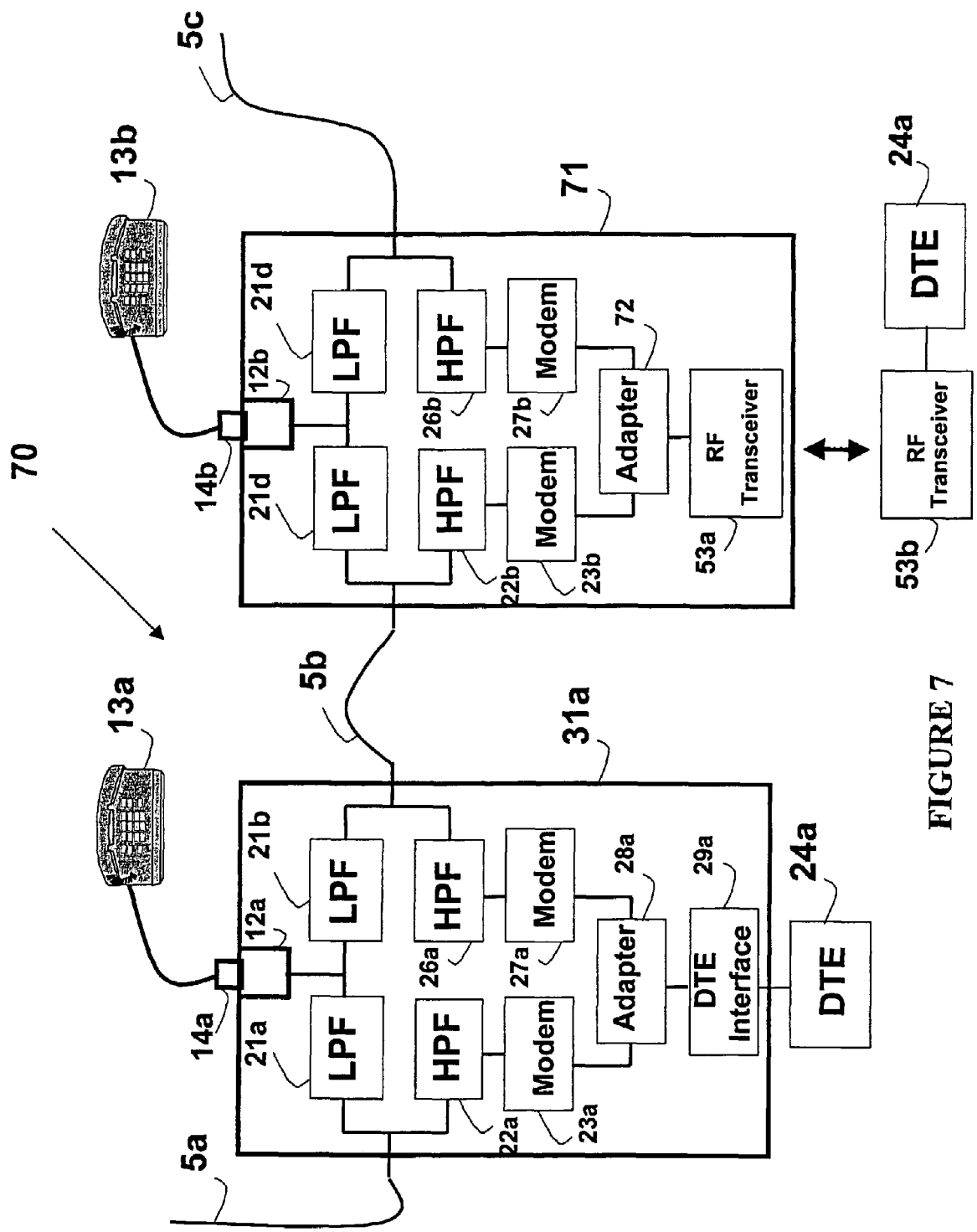
FIG. 7 shows a second embodiment of a local area network based on telephone lines as the wired segment and radio frequency communication for the non-wired segment.

The invention can equally well be applied to the prior art wired network illustrated in FIG. 3. FIG. 7 shows part of a network 70. Outlet 31a represents a prior-art network outlet. In order to interface to the non-wired network segments, an outlet 71 according to the present invention must be used. With the exception of RF transceiver 53a within outlet 71, which communicates with RF transceiver 53b connected to a DTE 24a, outlet 71 is similar to outlet 31a. In this embodiment, the module includes two telephone line modems 23b and 27b, a three-port adapter 72 (for the two wired ports and the single non-wired port), and RF transceiver 53a. The advantages offered by the prior-art topology apply also for this configuration.

While the present invention has been described above for the case where the wired media is based on a telephone line system and includes telephone wires and telephone outlets, the present invention can equally well be applied to other wired systems such as those based on power and cable television signal distribution. In the case of an electrical power distribution system, the electrical wires and outlets employed for power distribution in the house are used. Similarly, cable television wiring and outlets can also be used. In all cases, it may be necessary to retain the basic service for which the wiring systems were installed: telephony service, electrical power distribution, or television signals. This is usually achieved by adding the appropriate circuitry to separate the data communication network from the basic service, as well as to avoid interference of any kind between the two roles currently employing the same wiring. For example, the LPF's 21a, 21b, 21c, and 21d; and HPF's 22a, 22b, 26a, and 26b (FIG. 7) serve the role of separating the telephony service from the data communication network and vice-versa.

While the present invention has been described above for the case wherein the non-wired communication is accomplished by radio-frequency transmission, the present invention can be equally applied to other types of non-wired communication, such as:
  1. Non-wired communication accomplished by other forms of electromagnetic transmission. Electromagnetic waves in various parts of the electromagnetic spectrum can be used for communication. For example, low-frequency electromagnetic radiation can be used to transmit audio-frequency signals over short distances without a carrier. Radio-frequency transmission is a special case of this general electromagnetic transmission. As noted previously, light is also a special case of electromagnetic radiation, but is herein treated separately because of the characteristics of light are distinctly different from those of electromagnetic transmission in other usable parts of the electromagnetic spectrum.
  2. Non-wired communication accomplished by light. Either visible or non-visible light wavelength can be used for such transmission. As previously noted, currently, the most popular is infrared (IR) based communication. Most such systems require substantially 'line-of-sight' access.
  3. Non-wired communication accomplished by sound. Either audible sound (20-20,000 Hz band), or inaudible sound (ultrasonic, above 20,000 Hz; or infrasonic, below 20 Hz).

In addition to the described data communication function, the network according to the present invention can also be used for control (e.g. home automation), sensing, audio, or video applications, and the communication can also utilize analog signals (herein denoted by the term "analog communication"). For example, a video signal can be transmitted in analog form via the network.

Upgrade Kit

Figure 8:
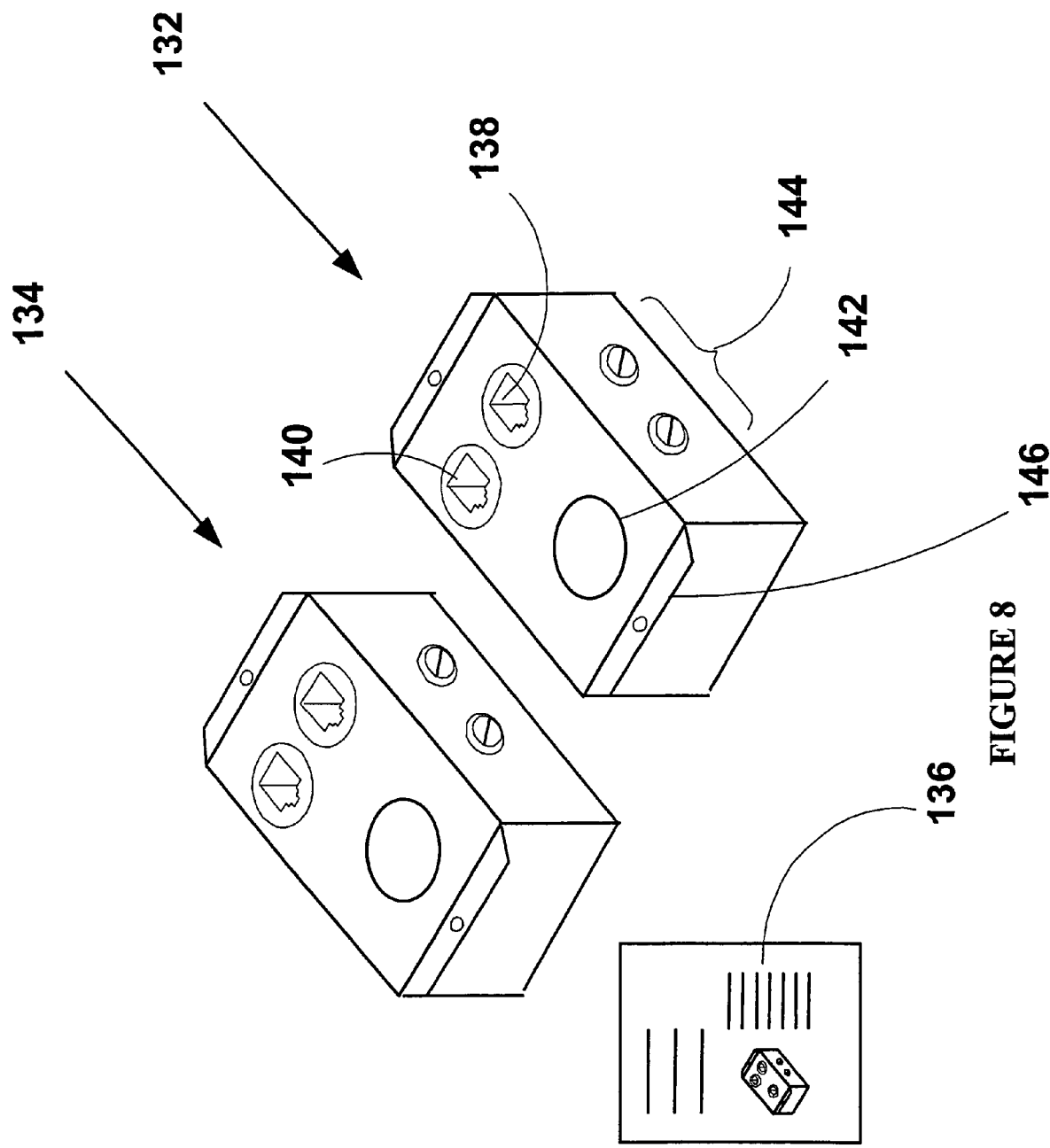
FIG. 8 shows a kit for upgrading existing electrically-conducting lines to support a network according to the present invention.

The present invention also contemplates a kit for upgrading existing electrically conducting lines to support a network as described above. FIG. 8 illustrates an embodiment of such a kit containing an outlet 132 and an outlet 134 and installation instructions 136. Outlet 132 has connection 144 for coupling to a wired segment and mounting points such as a flange 146 for installing in the building walls. Outlet 132 also has a jack 138 and a jack 140 for connecting to external devices via cables, and a transducer 142 for connecting to external data units via a non-wired segment. Within outlet 132 is a module according to the present invention, as previously described and illustrated in FIG. 5. In one embodiment, transducer 142 is a radio frequency transceiver. In another embodiment, transducer 142 is a combined light-emitting diode and photocell receiver. In still another embodiment, transducer 142 is a combined speaker and microphone. Likewise, in one embodiment, jack 138 is a telephone jack. In another embodiment, jack 138 is an electrical power socket. In still another embodiment, jack 138 is a cable television jack. In one embodiment, jack 140 is a data jack. The embodiment of the kit illustrated in FIG. 8 has two outlets, outlet 132 and outlet 134, which are illustrated as substantially identical. However, in another embodiment, the kit contains only outlet 132. In still another embodiment, outlet 134 does not contain a transducer. Other variations are also possible in different embodiments.

It will also be appreciated that the outlet and the adapter module may be provided as separate components for use in upgrading existing wiring of a building to support a local area network having at least one wired segment and at least one non-wired segment. They may likewise find independent use for further expanding a hybrid network that has previously been upgraded according to the invention. Such an outlet is provided with a first coupler for coupling the outlet to the at least one non-wired segment, and a second coupler for coupling the outlet to the existing wiring via an adapter module. The adapter module may be either fully or partially integrated within the outlet.

A method for upgrading existing electrically conducting lines within a building to support a network according to the present invention involves:
  (a) providing a wired modem;
  (b) providing a non-wired modem;
  (c) providing an adapter for handling the data communications between a wired segment and a non-wired segment; and
  (d) providing an outlet, and
  (e) equipping the outlet with the wired modem, the non-wired modem, and the adapter.

While the invention has been described with respect to a limited number of embodiments, it will be appreciated that many variations, modifications and other applications of the invention may be made.

What is claimed is:

1. A module for coupling a wired digital data signal to a wireless data unit, for use with an existing electrical CATV distribution infrastructure in a building, the infrastructure having a CATV coaxial cable carrying a CATV signal and a wall-mounted CATV outlet connected to the CATV coaxial cable, the CATV coaxial cable concurrently carrying a wired digital data signal and a CATV signal using frequency division multiplexing, wherein the wired digital data signal is carried over a high frequency band and the CATV signal is carried over a low frequency band, said module comprising:
    a coaxial cable connector that is electrically and mechanically connectable to the CATV outlet for connecting to the CATV coaxial cable;
    a high pass filter coupled to said coaxial cable connector for passing only the wired digital data signal;
    a CATV modem coupled to the high pass filter and operative for bi-directional packet-based digital data communication of the wired digital data signal over the CATV coaxial cable using a wired digital data protocol;
    a radio frequency modem operative for conducting standard-based bi-directional packet-based digital data communication of a wireless digital data signal using a wireless digital data protocol;

a packet-based digital protocol adapter consisting of one of a bridge, a router and a gateway, coupled between said CATV modem and said radio-frequency modem for converting data between the wireless digital data protocol and the wired digital data protocol; and a single enclosure containing said coaxial cable connector, said high pass filter, said CATV modem, said radio frequency modem and said protocol adapter.

2. The module according to claim 1, wherein the module is further mechanically detachable from the CATV outlet.

3. The module according to claim 1, wherein the wireless digital data signal is based on IEEE802.11 standard.

4. The module according to claim 1, wherein said module is further connectable to a TV set, and said module further comprises:

a low pass filter coupled to said coaxial cable connector for passing only the CATV signal; and a second coaxial cable connector coupled to said low pass filter and connectable to the TV set, for coupling the CATV signal to the TV set.

5. The module according to claim 1, wherein said module is further connectable to a wired data unit, and said module further comprises:

a data connector connectable to a wired data unit; and a data transceiver coupled between said data connector and said packet-based digital protocol adapter, for conducting standard-based bi-directional packet-based digital data communication with the wired data unit.

6. The module according to claim 5, wherein said data connector and said data transceiver are operative to constitute a standard IEEE802.3 interface.

7. The module according to claim 1 wherein said radio frequency modem is further operative to establish a wireless communication link that is part of one of: a WLL network, a LMDS network, and a satellite network.

8. The module according to claim 1, wherein said CATV modem is further operative for conducting standard-based bi-directional packet-based digital data communication with two or more identical CATV modems coupled to other CATV outlets connected to the CATV coaxial cable.

9. The module according to claim 1, wherein said radio frequency modem is further operative for conducting standard-based bi-directional packet-based digital data communication with two or more identical radio frequency modems employing the wireless digital data signal, and the wireless digital data signal is a radio frequency signal conforming to a standard-based wireless digital data protocol.

10. A CATV outlet for coupling a wired digital data signal to a wireless data unit, for use with an existing electrical CATV distribution infrastructure in a building, the infrastructure having a CATV coaxial cable carrying a CATV signal and extending to a wall cavity for a wall-mounted CATV outlet, the CATV coaxial cable concurrently carrying a wired digital data signal and a CATV signal using frequency division multiplexing, wherein the wired digital data signal is carried over a high frequency band and the CATV signal is carried over a low frequency band, said CATV outlet comprising:

a coaxial cable connector for connecting to the CATV coaxial cable;

a high pass filter coupled to said coaxial cable connector for passing only the wired digital data signal;

a CATV modem coupled to the high pass filter and operative for bi-directional packet-based digital data communication of the wired digital data signal over the CATV coaxial cable using a wired digital data protocol;

a radio frequency modem operative for bi-directional packet-based digital data communication of a wireless digital data signal using a wireless digital data protocol;

a packet-based digital protocol adapter consisting of one of a bridge, a router and a gateway, coupled between said CATV modem and said radio-frequency modem for converting data between the wireless digital data protocol and said wired digital data protocol; and a single enclosure containing said coaxial cable connector, said high pass filter, said CATV modem, said radio frequency modem and said protocol adapter, wherein said enclosure is mountable to the CATV outlet cavity.

11. The outlet according to claim 10, wherein said enclosure is dimensioned to fit an existing standard CATV outlet cavity.

12. The outlet according to claim 10, wherein the wireless digital data signal is based on IEEE802.11 standard.

13. The outlet according to claim 10, wherein the outlet is further connectable to a TV set, and said module further comprises:

a low pass filter coupled to said coaxial cable connector for passing only the CATV signal; and a second coaxial cable connector coupled to said low pass filter and connectable to the TV set, for coupling the CATV signal to the TV set.

14. The outlet according to claim 10, wherein the outlet is further connectable to a wired data unit, and said module further comprises:

a data connector connectable to the wired data unit; and a data transceiver coupled between said data connector and said packet-based digital protocol adapter, for conducting standard-based bi-directional packet-based digital data communication with the wired data unit.

15. The outlet according to claim 14, wherein said data connector and said data transceiver are operative to constitute a standard IEEE802.3 interface.

16. The outlet according to claim 10, wherein said radio frequency modem is further operative to establish a wireless communication link that is part of one of: a WLL network, a LMDS network and a satellite network.

17. The outlet according to claim 10, wherein said CATV modem is further operative for conducting standard-based bi-directional packet-based digital data communication with two or more identical CATV modems coupled to other CATV outlets connected to the CATV coaxial cable.

18. The outlet according to claim 10, wherein said radio frequency modem is further operative for conducting standard-based bi-directional packet-based digital data communication with two or more identical radio frequency modems employing the wireless digital data signal, and the wireless digital data signal is a radio frequency signal conforming to a standard-based wireless digital data protocol.

19. A module for coupling a wired digital data signal to a wireless data unit, for use with a CATV coaxial cable and a service coaxial cable, the CATV coaxial cable concurrently carrying a first wired digital data signal and a CATV signal using frequency division multiplexing, wherein the first wired digital data signal is carried over a high frequency band and the CATV signal is carried over a low frequency band, and the service coaxial cable concurrently carrying a second wired digital data signal carried over a service signal frequency band and a service signal using frequency division multiplexing, wherein the second wired digital data signal is carried over a frequency band distinct from the service signal frequency band, said module comprising:
- a coaxial cable connector that is electrically and mechanically connectable to a CATV outlet for connecting to the CATV coaxial cable;
- a first high pass filter coupled to said coaxial cable connector for passing only the first wired digital data signal;
- a CATV modem coupled to said first high pass filter and operative for bi-directional packet-based digital data communication of the first wired digital data signal with one or more identical CATV modems over the CATV coaxial cable using a first wired digital data protocol;
- a service connector for connecting to the service coaxial cable;
- a second high pass filter coupled to said service connector for passing only the second wired digital data signal;
- a service wiring modem coupled to said second high pass filter and operative for bi-directional packet-based digital data communication of the second wired digital data signal with one or more identical service wiring modems over the service coaxial cable using a second wired digital data protocol;
- a radio frequency modem operative for bi-directional packet-based digital data communication with one or more wireless data units employing a radio frequency wireless digital data signal conforming to a wireless digital data protocol;
- a packet-based digital protocol adapter consisting of one of a bridge, a router and a gateway, coupled to said CATV modem, said service wiring modem and said radio-frequency modem for converting data between the wireless digital data protocol and said first and second wired digital data protocols; and
- a single enclosure containing said coaxial cable connector, said first and second high pass filters, said CATV modem, said service wiring modem, said radio frequency modem and said protocol adapter.

20. The module according to claim 19, wherein said enclosure is structured to be mechanically externally attachable to the CATV outlet.

21. The module according to claim 19, wherein the module is further mechanically detachable from the CATV outlet.

22. The module according to claim 19, wherein the wireless digital data signal is based on IEEE802.11 standard.

23. The module according to claim 19, wherein said module is further connectable to a TV set, and said module further comprises:
- a low pass filter coupled to said coaxial cable connector for passing only the CATV signal; and
- a second coaxial cable connector coupled to said low pass filter and connectable to the TV set, for coupling the CATV signal to the TV set.

24. The module according to claim 19, wherein said module is further connectable to a wired data unit, and said module further comprises:
- a data connector connectable to the wired data unit; and
- a data transceiver coupled between said data connector and said packet-based digital protocol adapter, for conducting standard-based bi-directional packet-based digital data communication with the wired data unit.

25. The module according to claim 24, wherein said standard data connector and said data transceiver are operative to constitute a standard IEEE802.3 interface.

26. The module according to claim 19, wherein said radio frequency modem is further operative to establish a wireless communication link that is part of one of: a WLL network, a LMDS network and a satellite network.

27. The module according to claim 19, wherein said CATV modem is further operative for conducting standard-based bi-directional packet-based digital data communication with two or more identical CATV modems coupled to other CATV outlets connected to said CATV coaxial cable.

28. The module according to claim 19, wherein said radio frequency modem is further operative for conducting standard-based bi-directional packet-based digital data communication with two or more identical radio frequency modems, employing the radio frequency wireless digital data signal, and the radio frequency wireless digital data signal conforms to a standard-based wireless digital data protocol.

29. The module according to claim 19, wherein the service coaxial cable is a component of one of a telephone service, a CATV service, and a cable television service, the service signal is correspondingly one of a telephone signal, a CATV signal, and a cable television signal.

30. A method of conducting data communication over a network of CATV lines in a building, comprising:
(a) attaching, to each of a plurality of standard CATV outlets mounted on interior walls of first and second rooms of the building, a unit containing:
  (i) a CATV modem configured for bidirectional digital data communication to and from the CATV lines in accordance with a first communications protocol;
  (ii) an RF modem configured for bidirectional wireless digital data communication to and from transceivers in accordance with a second communications protocol; and
  (iii) a protocol adapter coupling the CATV modem and the RF modem,
said step of attaching causing the CATV modem to be electrically coupled to the CATV lines of the building;
(b) placing transceivers at select locations in rooms of the building in which the units are attached to outlets;
(c) wirelessly transmitting digital data from a transceiver in the first room;
(d) in response to wireless transmission in step (c), automatically causing the protocol adapter of a unit in the first room to convert the digital data from the first communications protocol to the second communications protocol and applying the converted data to the CATV modem of the same unit;
(e) in response to step (d), automatically transmitting the converted data through the CATV lines of the building to at least one of the units in the second room of the building;
(f) in response to step (e), automatically causing the protocol adapter of the unit in the second room to reconvert the digital data from the second communications protocol to the first communications protocol and to apply the reconverted data to the RF modem of the unit in the second room; and
(g) in response to step (f), automatically causing the RF modem of the unit in the second room to transmit the reconverted data to a transceiver in the second room.

31. A module for coupling a wired digital data signal to a wireless data unit, for use with an existing electrical CATV distribution infrastructure at least in part in a building, the infrastructure having a CATV coaxial cable carrying a CATV signal and a wall-mounted CATV outlet connected to the CATV coaxial cable, the CATV coaxial cable concurrently carrying a wired digital data signal and a CATV signal using frequency division multiplexing, wherein the wired digital data signal is carried over a high frequency band and the CATV signal is carried over a low frequency band, said module comprising:

a coaxial cable connector for connecting to the CATV coaxial cable;

a high pass filter coupled to said coaxial cable connector for passing only the wired digital data signal;

a CATV modem coupled to the high pass filter and operative for bi-directional packet-based digital data communication of the wired digital data signal over the CATV coaxial cable using a wired digital data protocol;

a radio frequency modem operative for conducting standard-based bi-directional packet-based digital data communication of a wireless digital data signal using a wireless digital data protocol;

a packet-based digital protocol adapter consisting of one of a bridge, a router and a gateway, coupled between said CATV modem and said radio-frequency modem for converting data between the wireless digital data protocol and the wired digital data protocol; and a single enclosure containing said coaxial cable connector, said high pass filter, said CATV modem, said radio frequency modem and said protocol adapter, and wherein said radio frequency modem is further operative to communicate with an outdoor broadband service.

32. The module according to claim 31, wherein the outdoor broadband service is based on one of: satellite, LMDS and WLL service.

33. The module according to claim 31, wherein the wireless digital data signal is based on IEEE802.11 standard.

34. The module according to claim 31, wherein said module is further connectable to a TV set, and said module further comprises:

a low pass filter coupled to said coaxial cable connector for passing only the CATV signal; and a second coaxial cable connector coupled to said low pass filter and connectable to the TV set, for coupling the CATV signal to the TV set.

35. The module according to claim 31, wherein said module is further connectable to a wired data unit, and said module further comprises:

a data connector connectable to a wired data unit; and a data transceiver coupled between said data connector and said packet-based digital protocol adapter, for conducting standard-based bi-directional packet-based digital data communication with the wired data unit.

36. The module according to claim 35, wherein said data connector and said data transceiver are operative to constitute a standard IEEE802.3 interface.

37. The module according to claim 35, wherein said CATV modem is further operative for conducting standard-based bi-directional packet-based digital data communication with two or more identical CATV modems coupled to other CATV outlets connected to the CATV coaxial cable.

38. The module according to claim 35, wherein said radio frequency modem is further operative for conducting standard-based bi-directional packet-based digital data communication with two or more identical radio frequency modems employing the wireless digital data signal, and the wireless digital data signal is a radio frequency signal conforming to a standard-based wireless digital data protocol.

* * * * *